US011896988B2

(12) United States Patent
Ferguson et al.

(10) Patent No.: US 11,896,988 B2
(45) Date of Patent: Feb. 13, 2024

(54) GRAPHICAL USER INTERFACE (GUI) FOR HEIGHT AND ROTATIONAL ADJUSTMENT SYSTEM FOR A PLURALITY OF SPRAY GUNS USED IN A LINE STRIPER

(71) Applicant: AVANT-GARDE IP LLC, Lorton, VA (US)

(72) Inventors: Scott Ferguson, Lorton, VA (US); Ramraj Soundararajan, Lorton, VA (US)

(73) Assignee: RAID ONE IP LLC, Tampa, FL (US)

( * ) Notice: Subject to any disclaimer, the term of this patent is extended or adjusted under 35 U.S.C. 154(b) by 738 days.

(21) Appl. No.: 17/060,054

(22) Filed: Sep. 30, 2020

(65) Prior Publication Data

US 2021/0016311 A1 Jan. 21, 2021

Related U.S. Application Data

(63) Continuation of application No. 16/048,220, filed on Jul. 27, 2018, now Pat. No. 10,828,656.

(51) Int. Cl.

*B05B 13/04* (2006.01)
*E01C 23/22* (2006.01)
*B05B 15/628* (2018.01)
*B05B 9/00* (2006.01)
*B05B 12/00* (2018.01)
*B05B 13/00* (2006.01)
*B05B 15/65* (2018.01)
*E01C 19/17* (2006.01)

(52) U.S. Cl.

CPC .......... *B05B 13/0421* (2013.01); *B05B 9/007* (2013.01); *B05B 12/002* (2013.01); *B05B 13/005* (2013.01); *B05B 15/628* (2018.02); *B05B 15/65* (2018.02); *E01C 19/176* (2013.01); *E01C 23/22* (2013.01)

(58) Field of Classification Search

CPC ............................... E01C 19/176; E01C 23/22

See application file for complete search history.

(56) References Cited

U.S. PATENT DOCUMENTS 1,004,438 A 9/1911 King
2,262,497 A 11/1941 Holesworth
2,647,793 A 8/1953 Edward
2,691,923 A 10/1954 Huck
4,220,282 A 9/1980 Behr
4,565,467 A 1/1986 Eigenmann (Continued)

FOREIGN PATENT DOCUMENTS

EP 1601566 B1 7/2008
EP 2152973 B1 5/2012

(Continued)

OTHER PUBLICATIONS

"AIRLESSCO Airless Paint Line Striper Service / Operation Manual Spray and Stripe 3000," Manual, Dec. 2008, 28pgs.

(Continued)

*Primary Examiner* — Dah-Wei D. Yuan
*Assistant Examiner* — Kristen A Dagenais
(74) *Attorney, Agent, or Firm* — IP AUTHORITY, LLC

(57) ABSTRACT

Disclosed within are various methods for adjusting height and rotation of a spray gun used in a line striper via a graphical user interface (GUI) in a control device.

23 Claims, 39 Drawing Sheets

(56) References Cited

U.S. PATENT DOCUMENTS

| | | | | |
|---|---|---|---|---|
| 4,624,602 | A | | 11/1986 | Kieffer et al. |
| 4,804,080 | A | | 2/1989 | Baba |
| 4,861,190 | A | | 8/1989 | Glassel |
| 5,169,262 | A | | 12/1992 | Wilson et al. |
| 5,213,480 | A | | 5/1993 | Yedinak et al. |
| 5,263,789 | A | | 11/1993 | Torntore et al. |
| 5,302,207 | A | * | 4/1994 | Jurcisin .................. E01C 23/22 118/305 |
| D349,711 | S | | 8/1994 | Torntore et al. |
| 5,368,232 | A | | 11/1994 | Schroeder |
| 5,485,960 | A | | 1/1996 | Troudt |
| 5,947,385 | A | | 9/1999 | Lanerd et al. |
| 6,413,012 | B1 | * | 7/2002 | Jones .................... E01C 23/166 404/94 |
| 6,811,351 | B1 | | 11/2004 | Schroeder |
| 6,913,417 | B2 | | 7/2005 | Lind et al. |
| 7,237,783 | B2 | | 7/2007 | Kieffer et al. |
| 7,303,155 | B2 | | 12/2007 | Kesti et al. |
| 7,654,771 | B2 | | 2/2010 | Schroeder et al. |
| 7,673,815 | B2 | | 3/2010 | Schroeder et al. |
| D619,625 | S | | 7/2010 | Schroeder et al. |
| D668,686 | S | | 10/2012 | Lins et al. |
| 9,422,679 | B1 | | 8/2016 | Zurcher |
| 10,000,230 | B2 | | 6/2018 | Lucas et al. |
| 10,087,590 | B2 | | 10/2018 | Lins |
| 10,113,277 | B2 | | 10/2018 | Charnenka et al. |
| 10,828,656 | B2 | | 11/2020 | Ferguson et al. |
| 10,876,261 | B2 | | 12/2020 | Wilkens et al. |
| 11,285,503 | B2 | | 3/2022 | Ferguson et al. |
| 2005/0001068 | A1 | | 1/2005 | Kesti et al. |
| 2005/0072858 | A1 | | 4/2005 | Lind et al. |
| 2005/0081783 | A1 | | 4/2005 | Hong |
| 2008/0099579 | A1 | | 5/2008 | Schroeder et al. |
| 2008/0205984 | A1 | | 8/2008 | Schroeder et al. |
| 2009/0010712 | A1 | | 1/2009 | Kipfer et al. |
| 2010/0189887 | A1 | | 7/2010 | Nielsen et al. |
| 2010/0256837 | A1 | | 10/2010 | Schmidt |
| 2010/0266756 | A1 | | 10/2010 | Knutson et al. |
| 2011/0194952 | A1 | | 8/2011 | Kiviahde et al. |
| 2012/0121332 | A1 | | 5/2012 | Fredrickson et al. |
| 2012/0121333 | A1 | | 5/2012 | Schroeder et al. |
| 2012/0128420 | A1 | | 5/2012 | Schroeder et al. |
| 2012/0325612 | A1 | | 12/2012 | Schroeder et al. |
| 2014/0205744 | A1 | | 7/2014 | McNutt |
| 2015/0097054 | A1 | | 4/2015 | Schroeder |
| 2015/0136020 | A1 | | 5/2015 | Lins et al. |
| 2017/0204571 | A1 | | 7/2017 | Schultz et al. |
| 2017/0204572 | A1 | | 7/2017 | Kuczenski |
| 2017/0232482 | A1 | * | 8/2017 | Fischer .................. B08B 3/028 239/71 |
| 2018/0001333 | A1 | | 1/2018 | Schroeder et al. |
| 2019/0031076 | A1 | | 1/2019 | Yamamoto et al. |
| 2020/0270826 | A1 | | 8/2020 | Dolinar et al. |
| 2021/0016310 | A1 | | 1/2021 | Davis et al. |
| 2022/0098804 | A1 | | 3/2022 | Wilkens et al. |

FOREIGN PATENT DOCUMENTS

| | | | |
|---|---|---|---|
| WO | 2009079459 | A1 | 6/2009 |
| WO | 2011017042 | A2 | 2/2011 |
| WO | 2011017043 | A2 | 2/2011 |
| WO | 2011017044 | A2 | 2/2011 |
| WO | 2011017046 | A3 | 2/2011 |
| WO | 20110188119 | A1 | 7/2011 |
| WO | 2013170047 | A1 | 11/2013 |

OTHER PUBLICATIONS

"LineLazer IV 200HS Airless Paint Striper: Repair Parts List," Graco manual, May 2013, 40pgs.

"LineDriver / LineDriver HD Models 2620041262005: Operation-Repair-Parts manual," Graco manual, May 2011, 62pgs.

"FieldLazer—Professional Field Marking Equipment," Graco product brochure, Rev. E Jan. 15, 2015, 9pgs.

"LineLazer—Professional Airless Line Striping Systems," Graco product brochure, Rev. K Jan. 15, 2015, 13pgs.

"Quick Start Guide—PowrLiner 550," Titan Tool Inc., Form No. 0293761A, 2011, 2pgs.

"SPEEFLO PowrLiner 850 Model No. 0290005 Owner's Manual," Titan Tool Owner's Manual, Form No. 0293747J, 2015, 56pgs.

"LineCrew 1250 Line Striper Owner's Manual Model No. 0509025," SprayTECH, Form No. 0509823A, 2003, 32pgs.

"LineCrew 750 Line Striper Owner's Manual Model No. 0509027," SprayTECH, Form No. 0509838A, 2003, 28pgs.

"LineCrew 1600 Line Striper Owner's Manual Model No. 0509026," SprayTECH, Form No. 0509834A, 2003, 32pgs.

* cited by examiner

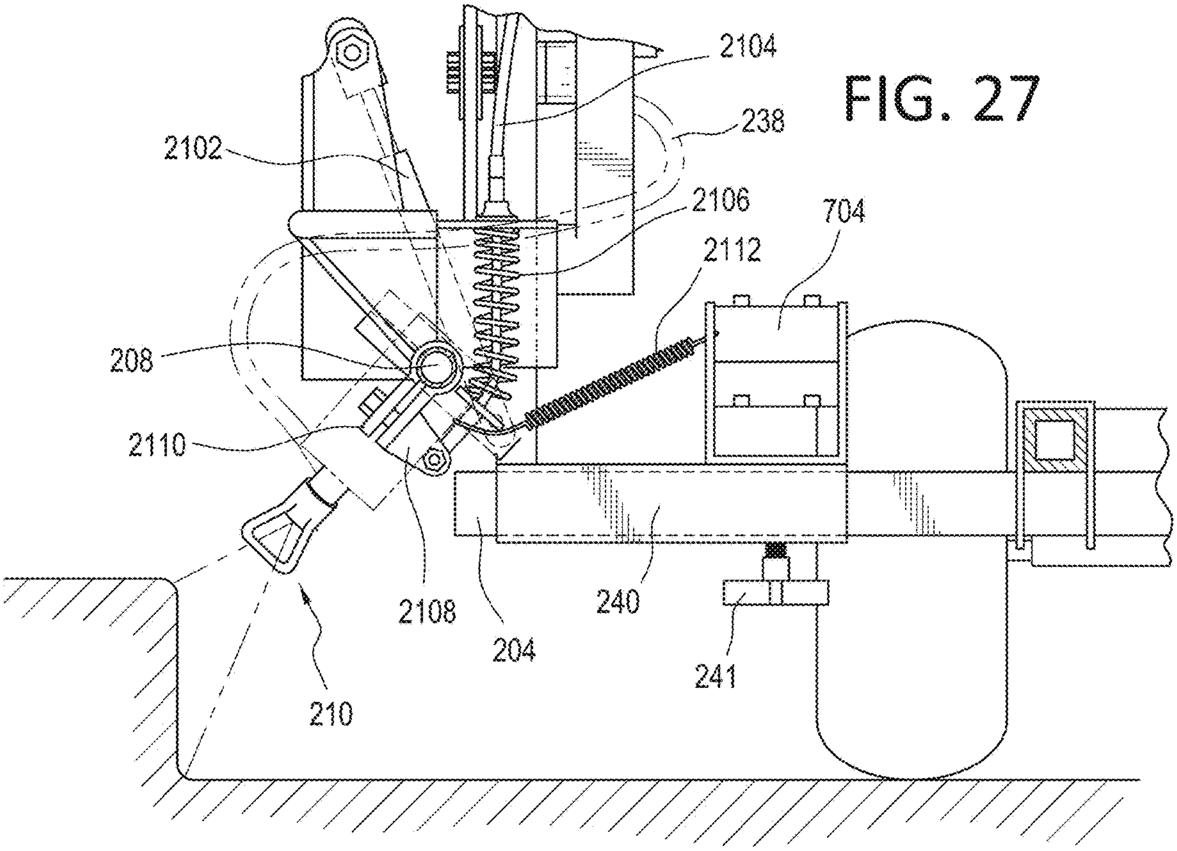
FIG. 27
FIG. 28
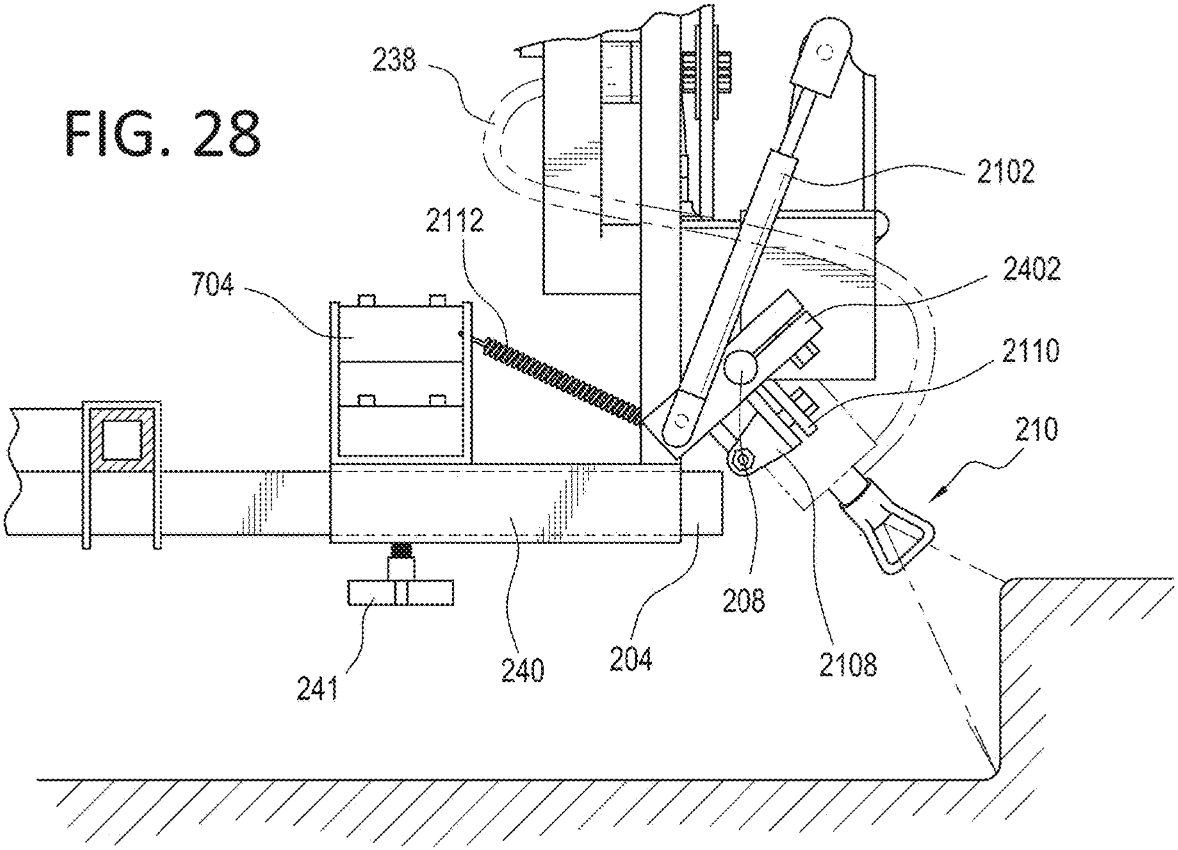

GRAPHICAL USER INTERFACE (GUI) FOR HEIGHT AND ROTATIONAL ADJUSTMENT SYSTEM FOR A PLURALITY OF SPRAY GUNS USED IN A LINE STRIPER

RELATED APPLICATIONS

This is a continuation application which claims the benefit of U.S. application Ser. No. 16/048,220 filed Jul. 27, 2018.

BACKGROUND OF THE INVENTION

Field of Invention

The present invention relates generally to the field of line stripers. More specifically, the present invention is related to a height and rotational adjustment system for one or more spray guns used in a line striper.

Discussion of Prior Art

FIG. 1(A) illustrates a typical prior art walk-behind line striper for spraying lines on a road, parking lot, etc. In this example, the user uses the handle bars to guide the line striper and uses a hand-operated release mechanism to spray the paint onto the desired surface.

FIG. 1(B) illustrates a prior art ride-on unit that may be used in conjunction with a line striper, such as the one shown in FIG. 1(A). Such a ride-on unit provides the convenience of automating movement of the line striper and helps reduce fatigue and increases productivity.

While FIG. 1(A) depicts a line striper with a single spray gun for painting one line, it is known in the prior art to have two-gun systems with two spray guns. An example of such a two-gun system is shown in FIG. 1(C), with a close-up of the spray guns shown in FIG. 1(D).

FIG. 1(E) depicts parts associated with a typical prior art line striper 100. In striper 100 of the prior art, frame rails 102 and 103 run generally parallel to one another. A spray gun mount tube 104 is mounted to rail 103 only using clamp 106. A mounting bracket 108 is attached to gun mount tube 104 and retains spray gun mounting means 110 therein. A gasoline engine 112 is mounted on frame rails 102 and 103.

In the prior art, the height of the spray gun is adjusted manually using clamp 114, which is loosened allowing the mounting bracket piece holding the spray gun to be moved vertically on pole 116. Once the desired height is reached, the user then locks in the height by tightening clamp 114. While there are minor variations regarding how the spray gun may be manually mounted onto the pole or other elements of the line striper, a user has to manually adjust the height (to a desired height) of the spray gun in all prior art line striping systems.

Accordingly, a major problem associated with such prior art stripers is that they do not give a user (of the striper) an easy way to adjust the height of the spray gun. Such height adjustment is critical to obtain a proper width of the painted line. That is, the height of the striper needs to be adjusted on any given day (or more than once during the day) depending on various factors, such as the outside temperature at the time of use (of the striper), composition of the paint, viscosity of the paint, humidity of the air, etc.

For example, depending on the temperature on a given day compared to when the striper was last used, the height of the striper may need to be adjusted (to account for the new day's temperature) to get a line of the desired dimension. Similarly, depending on the type of paint used in the striper (compared to what was used the last time), the height of the striper may need to be adjusted (to account for the new paint being used) to get a line of the desired dimension.

In such situations, the user of such prior art stripers would first operate it and notice that the desired dimension of the line is not being attained. In response, the user (of the striper) would have to stop the striper and manually adjust the clamp/height mechanism to another height and paint the line again to see if the desired width is obtained. If the desired dimensions are not obtained, the user (of the striper) iteratively repeats the procedure manually until the desired width of the painted line is achieved. This is a time-consuming procedure and is not optimized to obtain the desired width of the painted line.

Whatever the precise merits, features, and advantages of the above noted prior art, none of them achieves or fulfills the purposes of the present invention.

SUMMARY OF THE INVENTION

In one embodiment, the present invention provides a method for adjusting a height and rotation of a spray gun used in a line striper via a graphical user interface (GUI) in a control device, the method comprising: (a) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar; (b) raising or lowering the spray gun mount bar based on the first user selection received in (a); (c) receiving, via the GUI, a second user selection to rotate, either clockwise or counter-clockwise, an angular adjustment mechanism coupled to the spray gun mount bar; and (d) rotating clockwise or counter-clockwise the spray gun mount bar based on the second user selection received in (c).

In another embodiment, a method for adjusting a height and rotation of a spray gun used in a line striper via a graphical user interface (GUI) in a control device, the method comprising: (a) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar; (b) transmitting a first command to the height adjustment mechanism to raise or lower the spray gun mount bar by a predetermined distance based on the first user selection received in (a); (c) receiving, via the GUI, a second user selection to rotate, either clockwise or counter-clockwise, an angular adjustment mechanism coupled to the spray gun mount bar; and (d) transmitting a second command to the angular adjustment mechanism to rotate clockwise or counter-clockwise the spray gun mount bar by a predetermined angle based on the second user selection received in (c), wherein the height adjustment mechanism receives the first command and raises or lowers the spray gun mount bar by the predetermined distance based on the first command and the angular adjustment mechanism receives the second command and rotates the spray gun mount bar by the predetermined angle based on the second command.

In yet another embodiment, the present invention provides a method for adjusting a height and rotation of a spray gun used in a line striper via a graphical user interface (GUI) in a control device, the method comprising: (a) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar; (b) wirelessly transmitting a first command to the height adjustment mechanism to raise or lower the spray gun mount bar by a predetermined distance based on the first user selection received in (a); (c) receiving, via the GUI, a second user selection to rotate, either clockwise or counter-clockwise, an angular adjustment mechanism coupled to the spray gun mount bar; and (d) wirelessly transmitting a second command to the angular adjustment mechanism to rotate clockwise or counter-clockwise the spray gun mount bar by a predetermined angle based on the second user selection received in (c), wherein the height adjustment mechanism wirelessly receives the first command and raises or lowers the spray gun mount bar by the predetermined distance based on the first command and the angular adjustment mechanism wirelessly receives the second command and rotates the spray gun mount bar by the predetermined angle based on the second command.

BRIEF DESCRIPTION OF THE DRAWINGS

FIGS. 2-3 and 21-28 illustrate one non-limiting example of a height and angular adjustment mechanism for a spray head in a line striper.

DESCRIPTION OF THE PREFERRED EMBODIMENTS

Figure 1A:
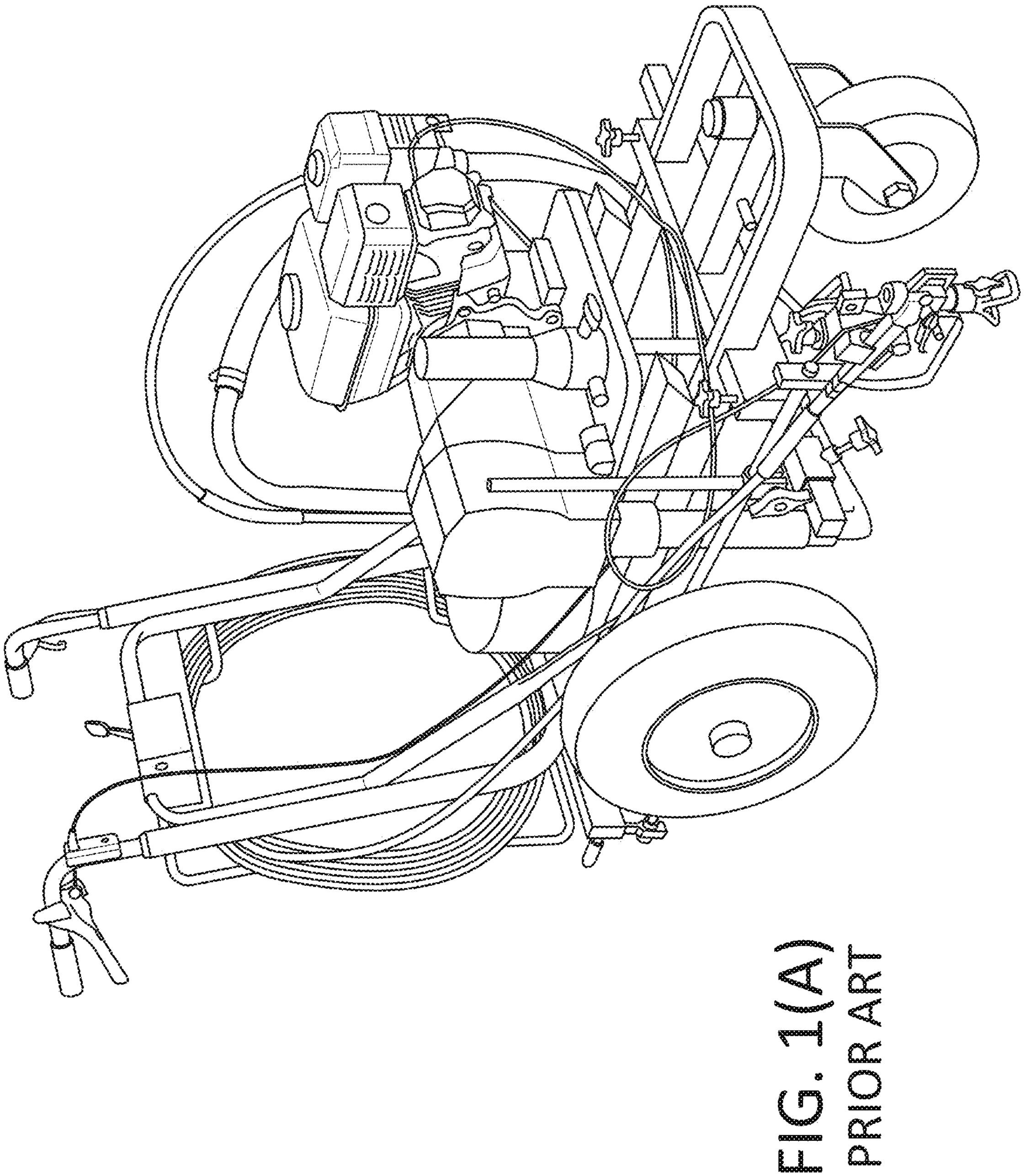
FIG. 1(A) PRIOR ART
FIGS. 1(A)-(E) illustrate prior art line stripers with manual height adjustment mechanism.
Figure 1B:
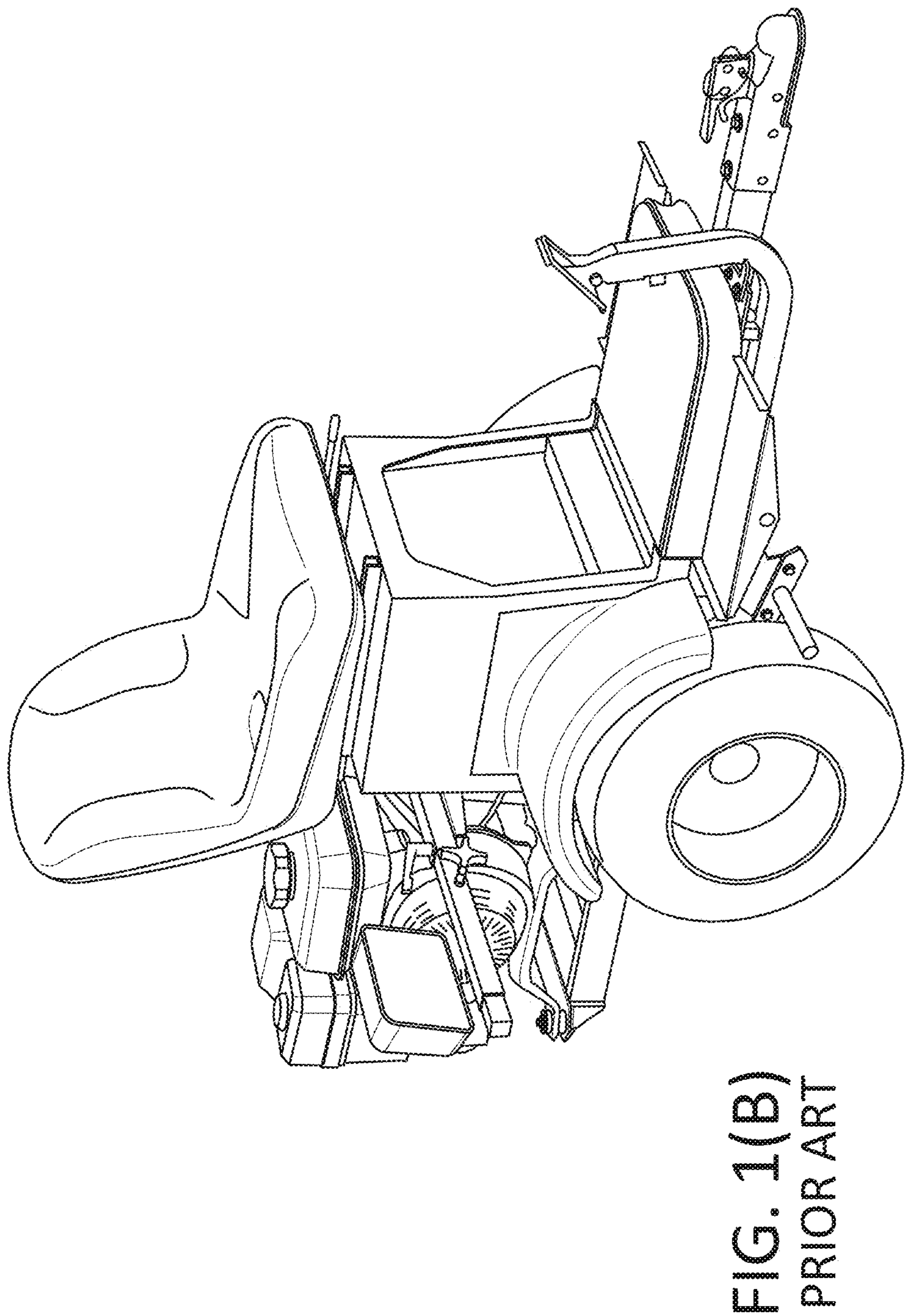
FIG. 1(B) PRIOR ART
Figure 1D:
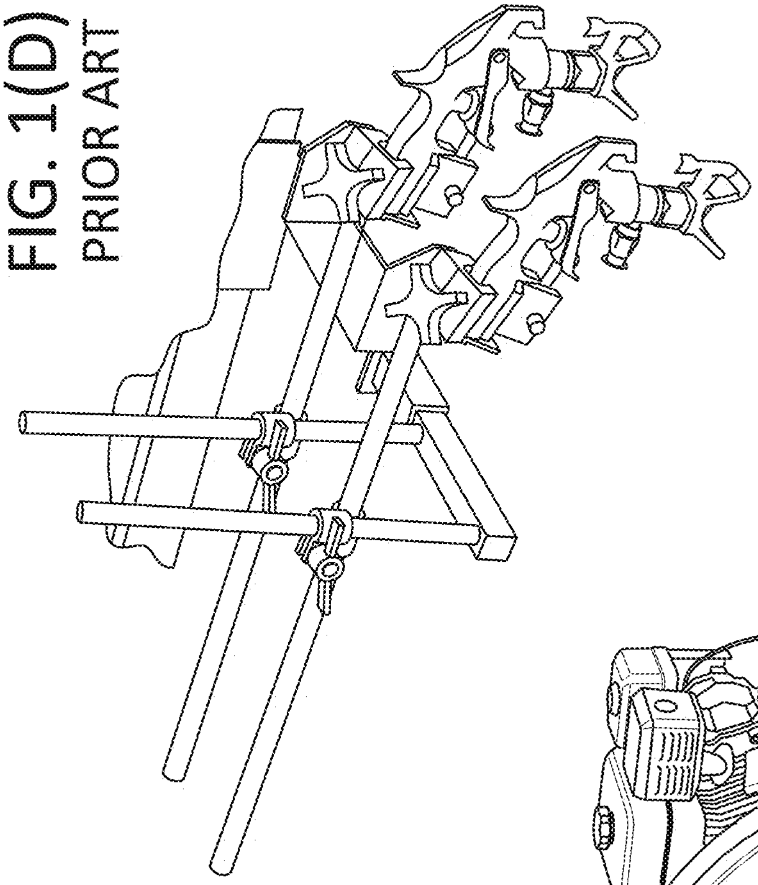
FIG. 1(D) PRIOR ART
Figure 1C:
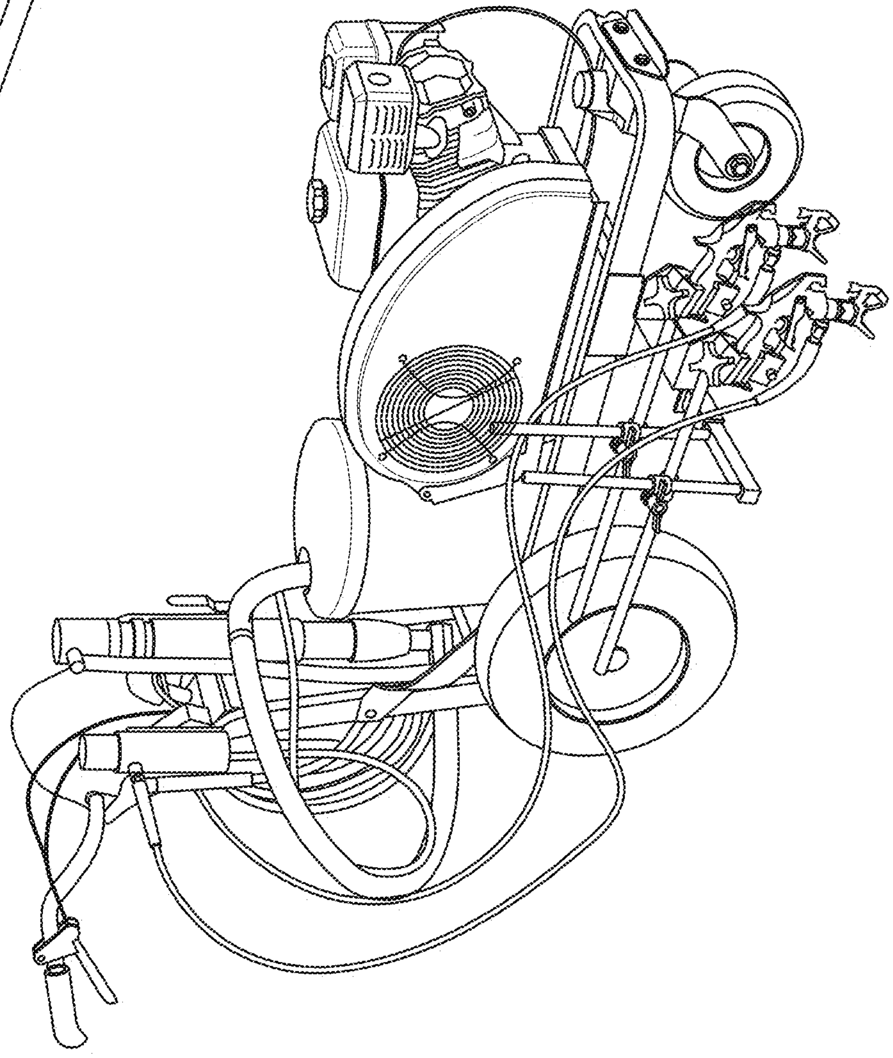
FIG. 1(C) PRIOR ART
Figure 1E:
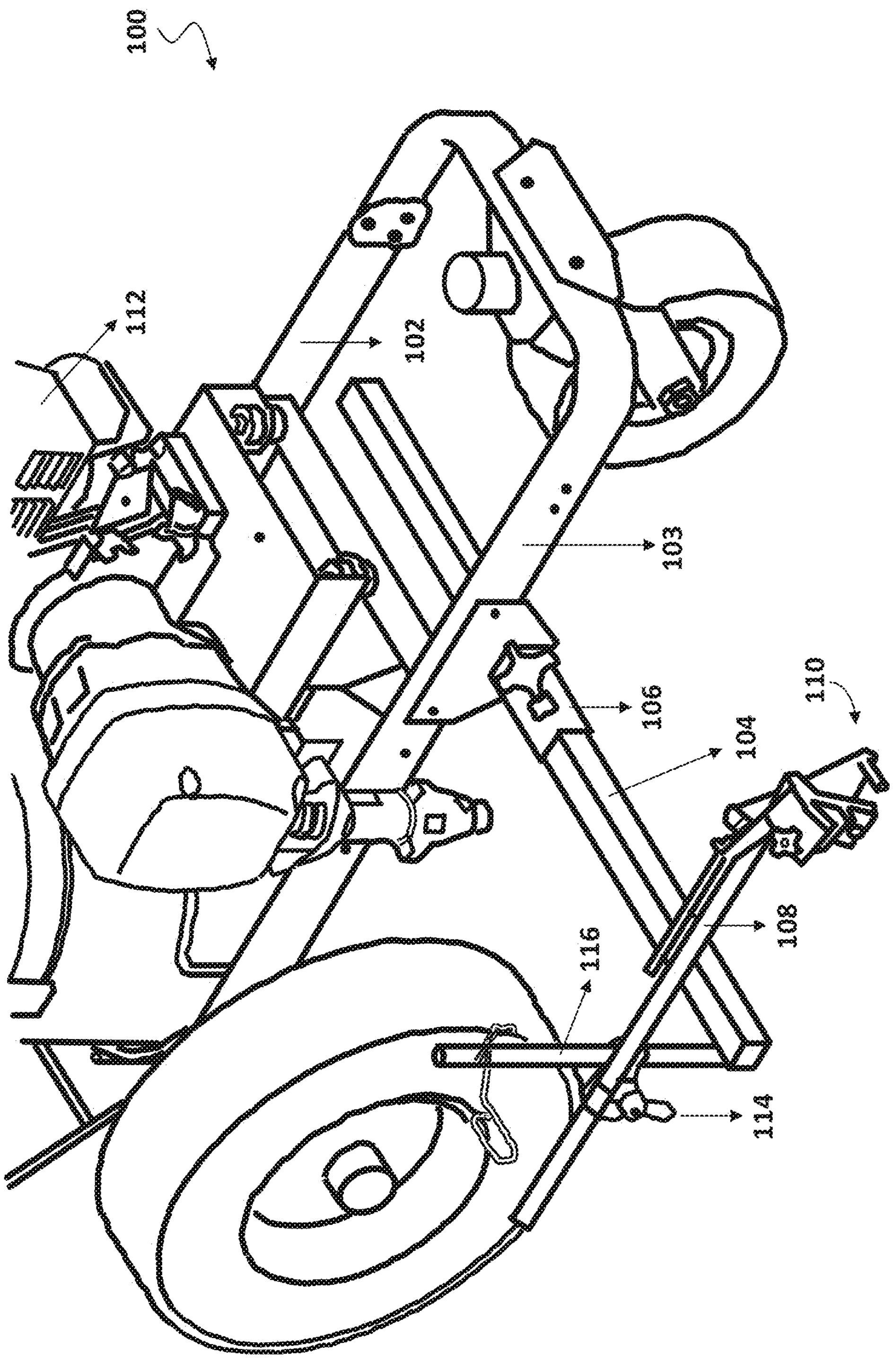
FIG. 1(E) PRIOR ART

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
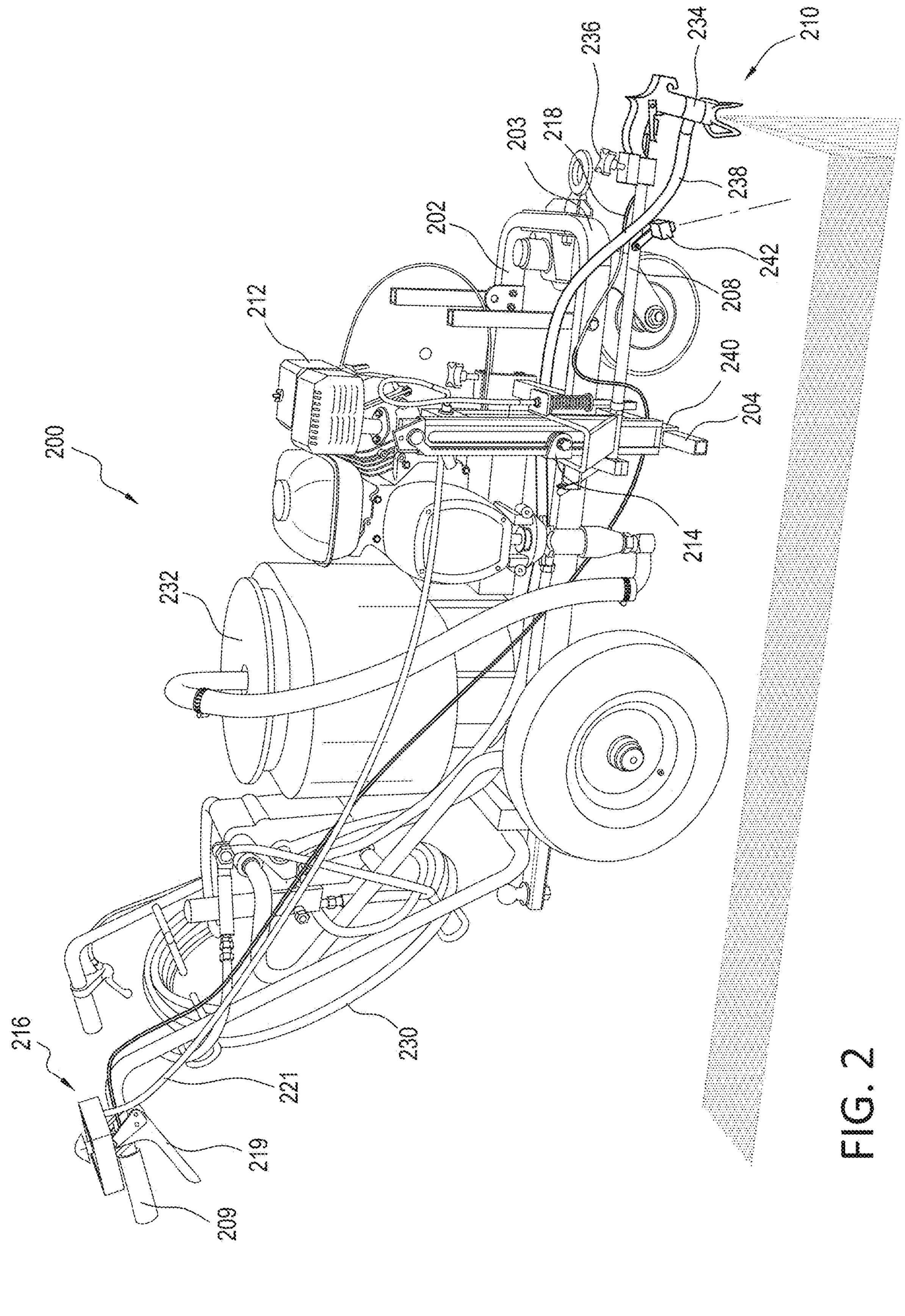
Figure 3:
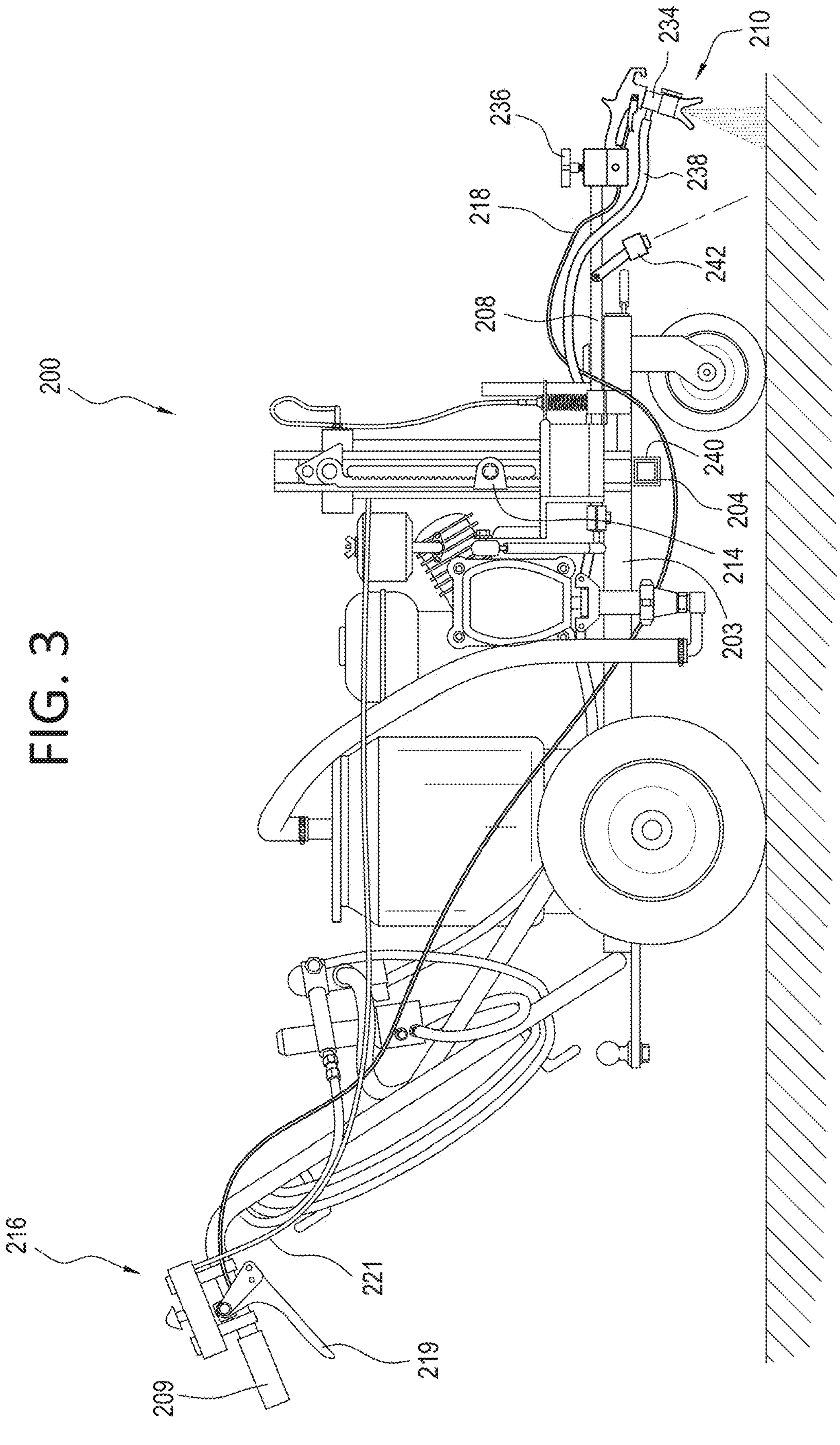

In FIGS. 2-3, striper 200, has frame rails 202 and 203 that run generally parallel to one another. A spray gun mount tube 204 is mounted to rail 203. A gasoline engine 212 is mounted on frame rails 202 and 203. Gasoline engine 212 is used to transport the paint in material container (or paint bucket) 232 to the spray gun 210 via the flexible spray hose 230 (which continues as tube 238 near spray gun 210) that is retained within a gun holder assembly 234

As best shown in FIGS. 2-3, the spray gun 210 has a trigger which is activated by use of a flexible cable 218 (which, in a non-limiting example, is a Bowden cable) connected to a pivotable lever (or spray lever) 219 mounted on the handle 209. By squeezing the lever 219 against the handle 209, the trigger on the spray gun 210 is activated causing a valve within the spray gun 210 to open resulting in paint being sprayed from a nozzle of the spray gun 210 when pressurized paint is in the tube 238.

In one embodiment, as shown in FIGS. 2-3, the present invention's height adjustment mechanism 214 is a linear actuator such as a simple rack-and-pinion-based assembly. In the example shown in FIGS. 2-3, the, generally horizontal, spray gun mount bar 208 and the, generally vertical, height adjustment mechanism 214 (mounted on a vertical support 2302 in FIGS. 23, 24, 26, and 30) are mounted on the spray gun mount tube 204 as shown. The spray gun 210 is retained within a gun holder assembly 234 that may either be part of, or is attached to, the spray gun mount bar 208. A knob 236 may be provided in the gun holder assembly 234 which may be rotated to securely hold the spray gun 210 in place. In this example, a generally vertical element (see vertical support 2302 in FIGS. 23, 24, 26, and 30) holding the height adjustment mechanism 214 and a generally horizontal spray gun mount bar 208 (where the spray gun mount bar 208 has the gun holder assembly 234 in which a spray gun 210 may be retained) are placed in position as shown by mounting the combination of the vertical element and the horizontal element onto the spray gun mount tube 204.

In this non-limiting example, the vertical element comprising the height adjustment mechanism is attached to a hollow tube 240, whose dimensions allow it to be slid over the spray gun mount tube 204 as shown in FIGS. 2-3. A locking mechanism, such as a support bar knob 241 (see, for example, FIG. 23), may be provided to lock the hollow tube 240 in place on the spray gun mount tube 204. It should be noted that while it is shown where the hollow tube 240, which is slightly larger in dimension slides over the spray gun mount tube 204, it could just as easily be made where hollow tube 240 contains a portion of another tube inserted within it, where at least another portion of the remainder of the another tube is inserted inside the spray gun mount tube 204. The specific shape of the hollow tube/spray gun mount tube or the specific manner in which the hollow tube is mounted to the spray gun mount tube should not be used to limit the scope of the invention.

Figure 20C:
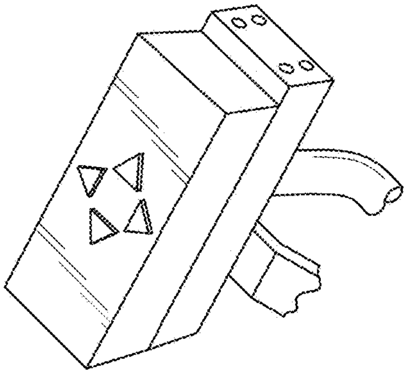
FIGS. 20(A)-(D) depict various non-limiting examples of control devices.

An operator adjusts the height of the spray gun 210 (retained in the gun holder assembly 234) on the spray gun mount bar 208 by raising or lowering the spray gun mount bar 208 that is attached to the height adjustment mechanism, where a control device 216 is used to do such raising or lowering. FIGS. 20(A) through 20(C) depict non-limiting examples of such a control device that may be used to raise or lower the spray gun 210 retained in the gun holder assembly 234. For example, the control device 216 may have control buttons disposed thereon which the user may operate to control the raising or lowering of the spray gun mount bar 208, which in turn raises or lowers the spray gun 210 that is mounted on the spray gun mount bar 208.

A user control device 216 is used to control the height of the height adjustment mechanism 214. An example of the user control device 216 is shown in FIG. 20(A) wherein various control elements (e.g., buttons, keys, scroll wheels, sliders, etc.) may be provided to adjust the height of the spray gun 210 via the height adjustment mechanism 214. It should be noted that while the control device 216 is shown with a plurality of control elements disposed thereon, other control elements are also envisioned within the scope of the invention.

FIG. 20(B) depicts one such non-limiting example of a joystick-type device that may be disposed in lieu of the buttons, where the joystick may be operated upon to similarly control the height adjustment mechanism 214, which in turn controls the height of the spray gun 210.

FIG. 20(C) depicts another such non-limiting example of a keypad-type device that may be disposed in lieu of the buttons of FIG. 20(A), where the keypad may be operated upon to similarly control the height adjustment mechanism 214, which in turn controls the height of the spray gun 210.

In one embodiment, cable 221 is not needed as signals from the control device 216 are transmitted wirelessly to the height adjustment mechanism 214. For example, the control device 216 and the height adjustment mechanism 214 may communicate via Bluetooth®, where instructions to adjust the height of the spray gun 210 are transmitted via Bluetooth® from the control device 216 to a Bluetooth® receiver (or Bluetooth® transceiver) located either within the height adjustment mechanism 214 or within close proximity of the height adjustment mechanism 214.

While Bluetooth® is mentioned in this disclosure for transmitting height adjustment commands, other wireless solutions, such as, but not limited to, wireless personal area networks (WPANs) or Wireless ad hoc networks (WANETs), could also be used without departing from the scope of the present invention. For example, Ultra-Wide-band (UWB), wireless data transmission based on magnetic induction (e.g., induction wireless), infrared wireless (e.g., wireless communications based on the Infrared Data Association (IrDA) standard), Wireless USB, ZigBee, Z-Wave, wireless communications based on wireless millimeter-wave (MMW or mmW) technology, peer-to-peer or ad hoc wireless LAN, wireless communications based on Wi-Fi (e.g., Ad-Hoc Wi-Fi, Wi-Fi Direct or peer-to-peer (P2P) Wi-Fi, etc.) to name a few, may also be used.

In another embodiment, the control device 216 may be a touchscreen that can communicate with the height control mechanism 214 either via a cable 218 or via a wireless connection (using a wireless connection as described above). The touch screen may be used to display graphically a height adjustment mechanism (e.g., a graphical slider), which the user uses to adjust to control the height of the spray gun 210 via the height adjust mechanism 214. In an extended embodiment, the touchscreen may be covered with a disposable protective cover (to protect the control device from paint smears, etc.) that is made of see-through material (e.g., plastic). Such a disposable protective cover may be replaced with a new one should there be paint smears, residue, dirt, etc. on the old one.

Figure 20D:
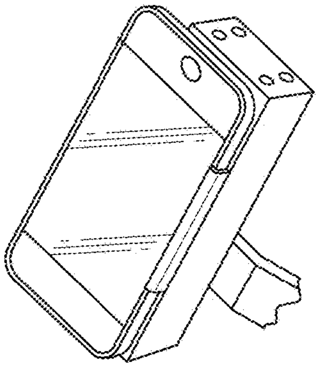
Figure 20B:
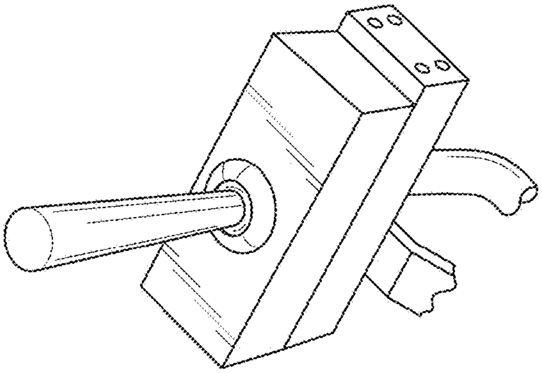
Figure 20A:
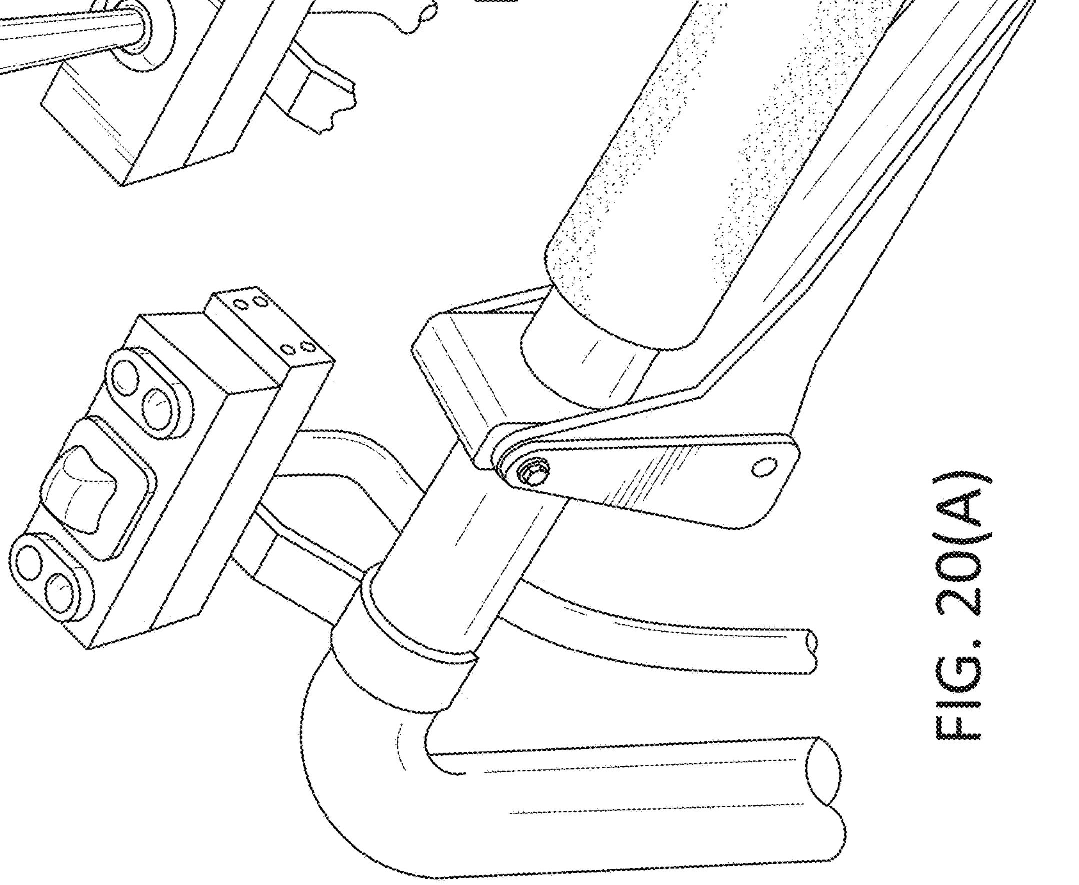

FIG. 20(D) depicts another such non-limiting example where the control device 216 could be a mobile device that can communicate wirelessly with the height adjustment mechanism. For example, the control device 216 may be a smartphone or a tablet or a PDA which can communicate with the height control mechanism 214 over a wireless protocol, e.g., Bluetooth®, where a user may operate an application within the smartphone or tablet to send signals to the height control mechanism 214.

Non-limiting examples of mobile devices include a mobile phone, a smart phone, a PDA, a tablet, etc. The user interacts with an application (i.e., an app) on the mobile device to set the desired height (e.g., by either entering a desired height or by iteratively adjusting graphically a control, such as a slider, to move the spray gun 210 to the desired height), where instructions from the mobile device for such height adjustment are wirelessly transmitted to a controller that controls a motor 702 to move the rack-and-pinion assembly 214 to the desired height. Similarly, instructions from the mobile device for rotation of the spray gun (by, for example, rotating the spray gun mount bar 208) may be wirelessly transmitted to a controller that controls a motor that effects such rotation (of, for example, the spray gun mount bar 208) to set the spray gun to the desired angle. The controller and motor may be combined into a single unit, or the controller may be present elsewhere on the striper.

Additionally, buttons may be provided on the user control device 216 which may be programmable (e.g., programmable via a touch screen also provided as part of the user control device 216). For example, the user may assign (via, for example, a touch screen also provided as part of the user control device 216) one of the buttons to correspond to a pre-determined height associated with the spray gun 210.

In another example, the striper may also be equipped with a global positioning system (GPS) and a memory (not shown), where, after setting a height using the user control device 216, a height of the spray gun 210 may be recorded (e.g., in the storage of the mobile device, or may be temporarily stored onboard the striper and transferred to the mobile device at a later point) for a given location (where the location is derived using the GPS system), where the recorded information may be recalled for setting the height of the spray gun during future use of the striper at the same location.

In another example, the temperature on a given day when the striper was last used along with the height used may be recorded (e.g., in the storage of the mobile device, or may be temporarily stored onboard the striper and transferred to the mobile device at a later point). When a similar temperature is observed on another day, the stored height may be used as a starting point to set the height of the spray gun. The operator may adjust the height further to get a line of the desired dimension.

In another example, the type of paint used when the striper was last used along with the height used may be recorded (e.g., in the storage of the mobile device, or may be temporarily stored onboard the striper and transferred to the mobile device at a later point). When a similar paint is used (as indicated by a user in the app on the mobile device) on another day, the stored height may be used as a starting point to set the height of the spray gun. The operator may adjust the height further to get a line of the desired dimension.

Other parameters such as humidity of the air, viscosity of the paint used, composition of the paint use, etc. may be input into the app, where such information is correlated with the height set in each instance and stored (e.g., in the storage of the mobile device, or may be temporarily stored onboard the striper and transferred to the mobile device at a later point). When a similar parameter is entered (as indicated by a user in the app on the mobile device; e.g., a paint with similar viscosity) on another day, the corresponding stored height may be used as a starting point to set the height of the spray gun. The operator may adjust the height further to get a line of the desired dimension.

Such stored information in the mobile device may be transmitted to a database for storage where such data regarding the height of the spray gun correlated with other factors may be shared with other users who may access such information via the app. The app may initialize the desired height automatically based on such accessed information.

In one example, a height of the spray gun 210 may be recorded, and a control element (such as, a button or a slider on a touch screen) on the user control device 216 may be programmed such that subsequent operation of that control element on the user control device 216 recalls, from a memory (not shown), the height that the spray gun needs to be set.

In one embodiment, one or more cameras 242 may be mounted, for example, on the spray gun mount bar 208. Camera(s) 242 may be mounted elsewhere on the line striper as long as the placement location of such camera provides a clear view of the striping operation. The location of the camera(s) 242 should not be used to limit the scope of the present invention. Camera(s) 242 may be provided for viewing the striping operation on a display that may be part of the control device 216 or on a display that is separate from the control device 216. For example, the control device 216 may be a smartphone or tablet and the output of the camera may be viewed (via, for example, an app) on the smartphone or tablet. As another example, the control device 216 may be as shown in FIGS. 20(A)-(C) where view of the striping operation may be wirelessly transmitted to an external device such as a smart phone or tablet that the operator carries to view the striping operation. Such wireless transmission (for transmitting camera data to a display or for sending camera commands from the control device 216 to the camera 242) may be accomplished via, for example, a Bluetooth® transmitter or transceiver that is part of the camera 242.

While Bluetooth® is mentioned in this disclosure for transmitting camera data or commands to the camera 242 from the control device 216, other wireless solutions, such as, but not limited to, wireless personal area networks (WPANs) or Wireless ad hoc networks (WANETs), could also be used without departing from the scope of the present invention. For example, Ultra-Wideband (UWB), wireless data transmission based on magnetic induction (e.g., induction wireless), infrared wireless (e.g., wireless communications based on the Infrared Data Association (IrDA) standard), Wireless USB, ZigBee, Z-Wave, wireless communications based on wireless millimeter-wave (MMW or mmW) technology, peer-to-peer or ad hoc wireless LAN, wireless communications based on Wi-Fi (e.g., Ad-Hoc Wi-Fi, Wi-Fi Direct or peer-to-peer (P2P) Wi-Fi, etc.) to name a few, may also be used.

Figures 21, 22:
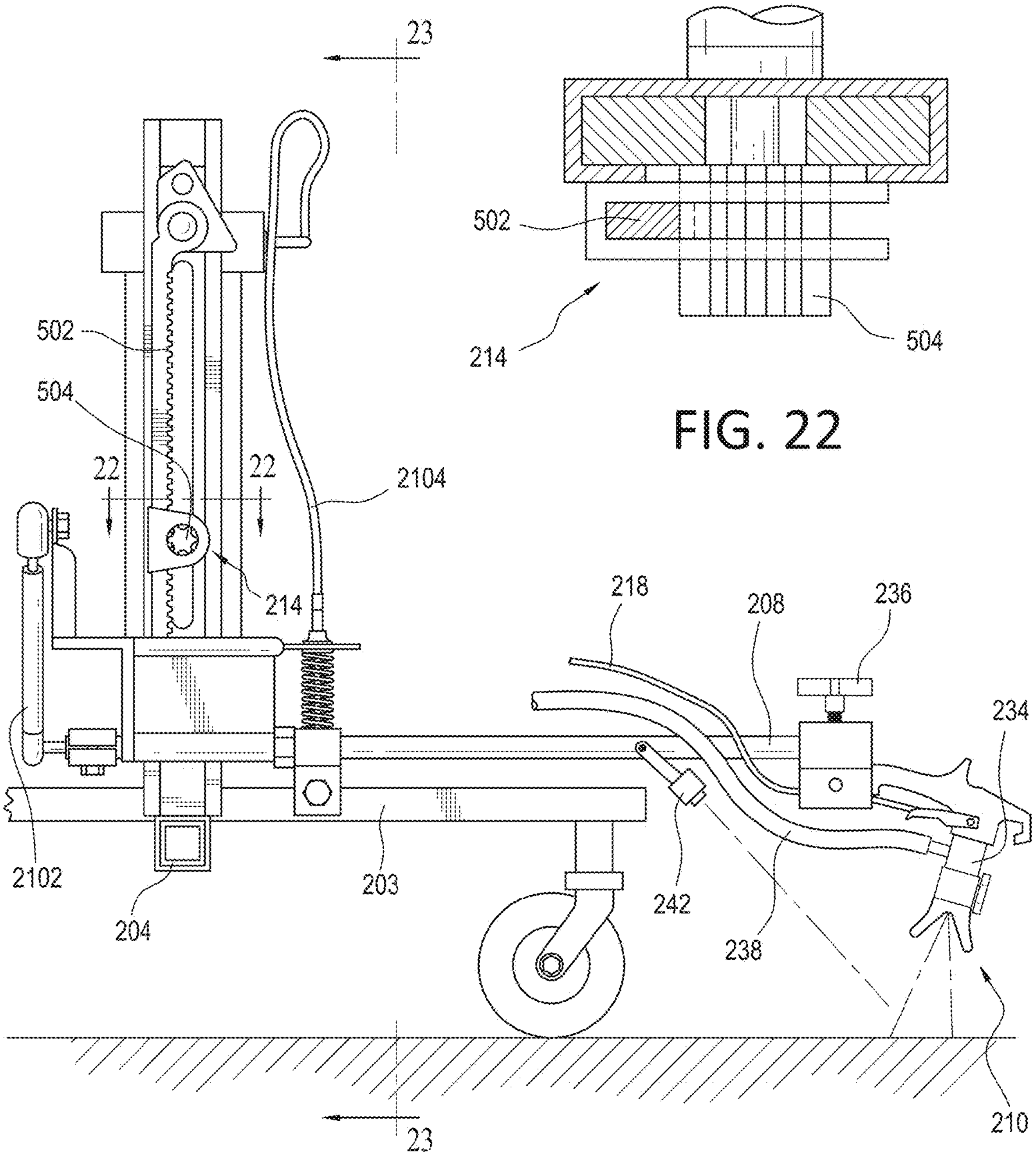
Figure 23:
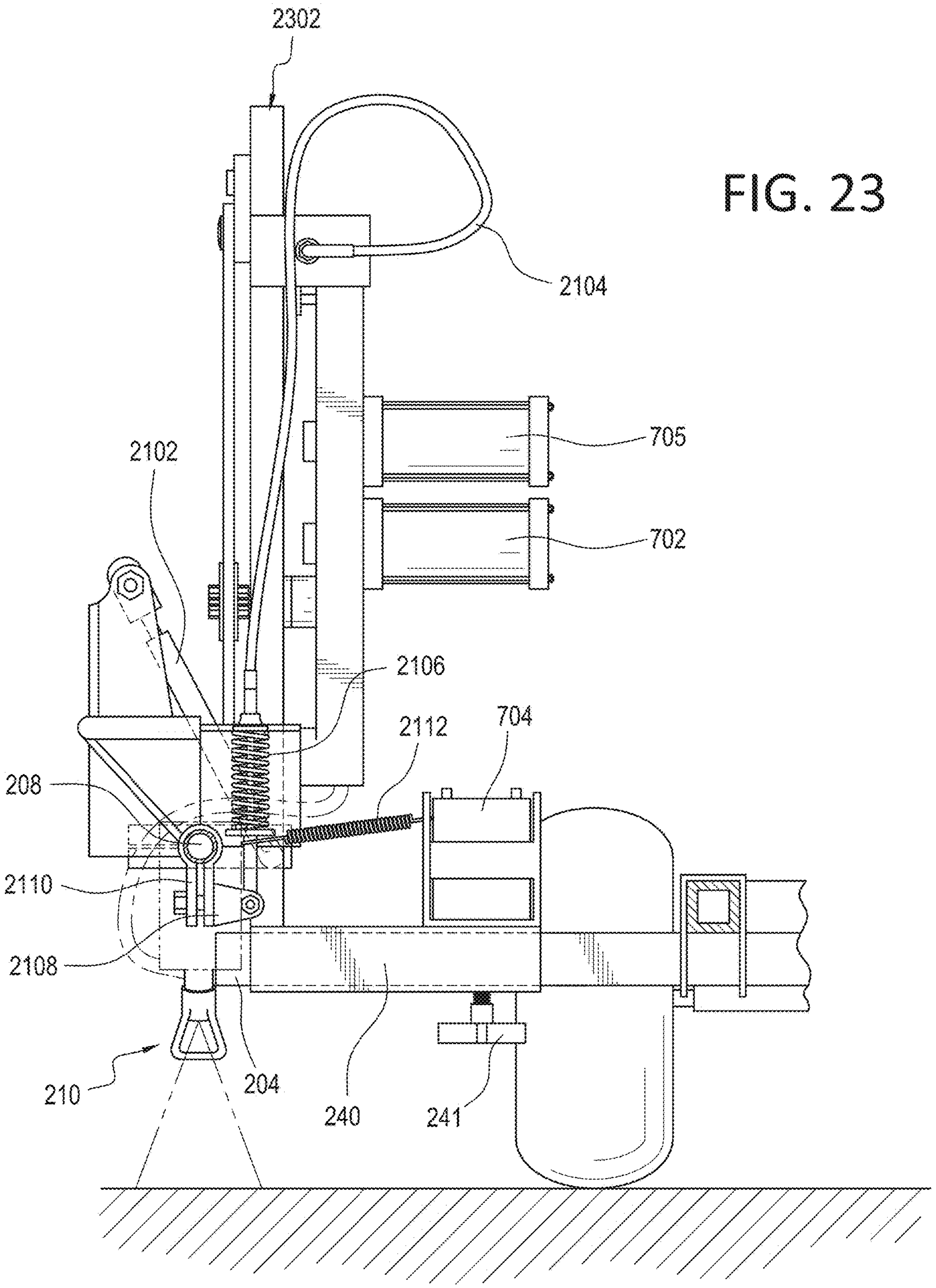
Figure 24:
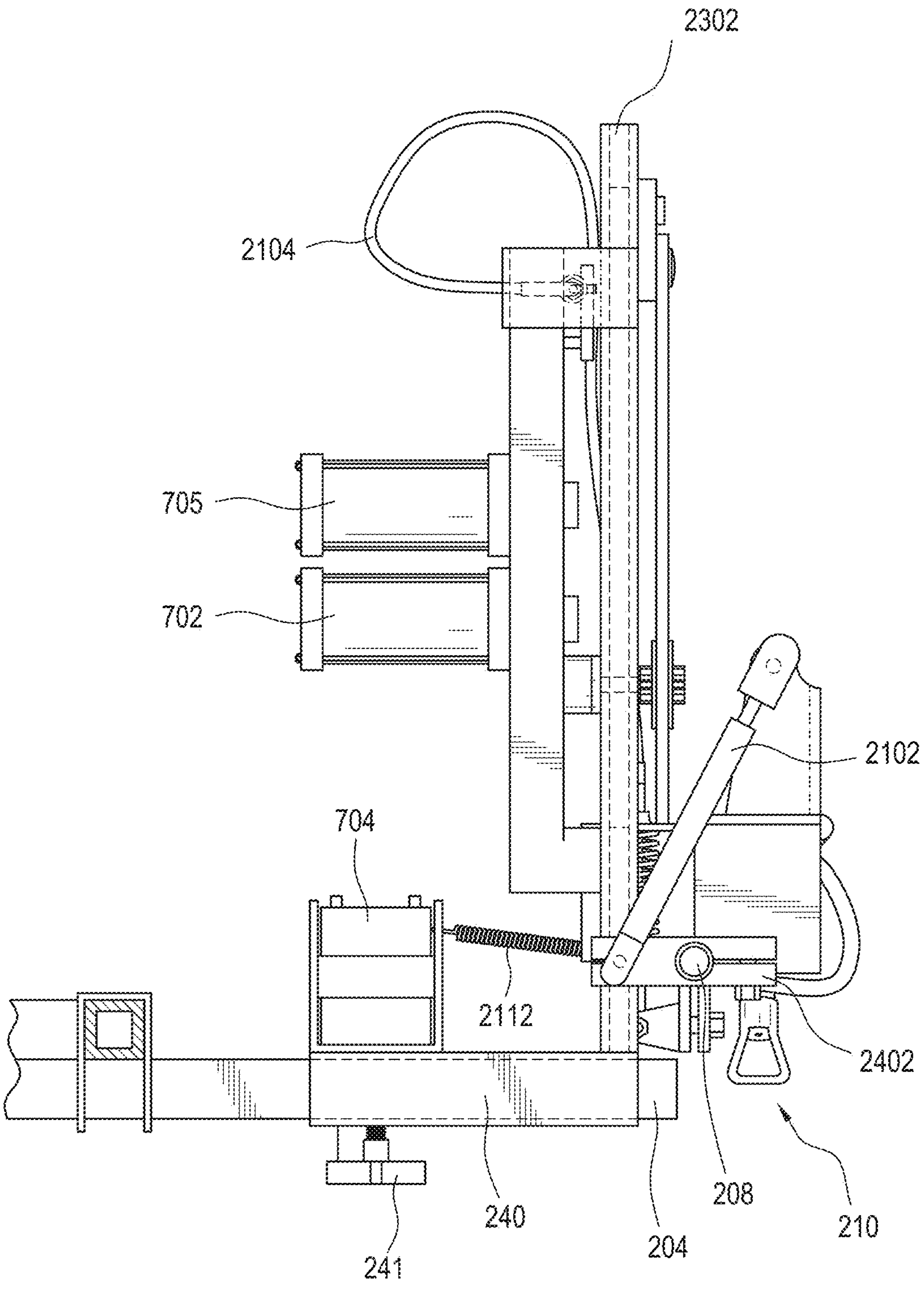
Figure 25:
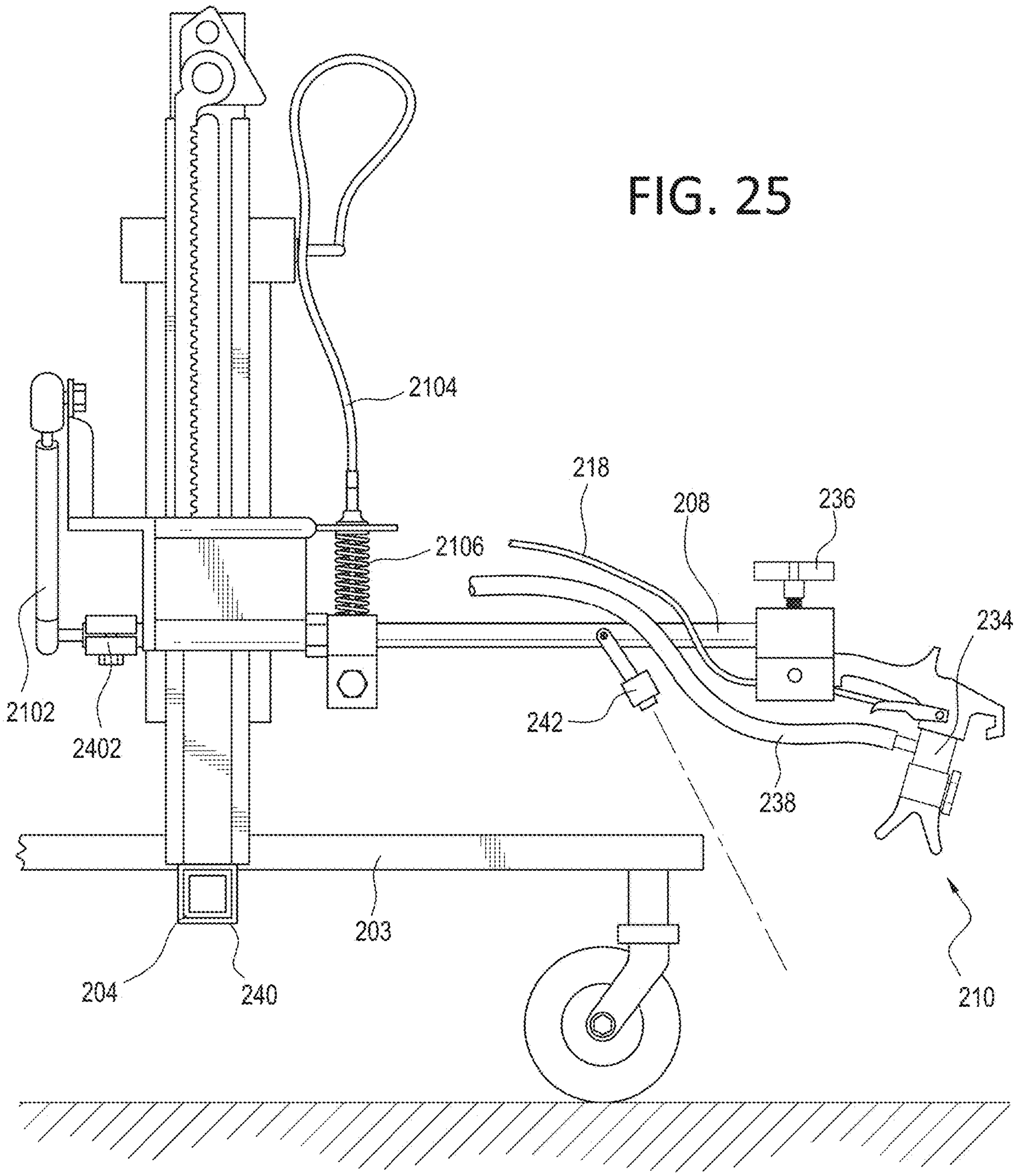

In FIGS. 2-3, an operator uses the control device 216 (examples shown in FIGS. 20(A)-(D)) to adjust the height of the spray gun mount bar 208 which retains the spray gun 210. FIG. 21 depicts, in greater detail, the height adjustment mechanism 214, particularly with respect to the rack-and-pinion assembly. FIG. 22 is a cross-sectional view defined by line 22-22 of FIG. 21. FIG. 23 depicts a front view the line striper as shown in FIG. 21. FIG. 24 depicts a rear view the line striper as shown in FIG. 21. The rack-and-pinion assembly comprises a vertical rack 502 whose slots a pinion 504 engages, where a rotational motion of the pinion 504 (caused by a motor 702 (see FIGS. 23 and 24)) moves it vertically (up or down), which provides the necessary height adjustment. Such movement may be effected, as described above, using the user control device 216, which transmits height control instructions from user either via a cable 221 or wirelessly to a controller that controls a motor 702 (Note: the controller and motor may be one unit as shown as element 702 in FIGS. 23 and 24) which effects the required rotation (i.e., required to move the spray gun to the desired height) of the pinion 504 of the rack-and-pinion assembly 214. FIG. 25 depicts a view when the spray gun mount bar 208 shown in FIG. 21 is raised to a given height by an operator using the control device 216.

It should be noted that while a separate motor 702 is shown for illustration purposes in FIGS. 23 and 24, such a motor 702 can be made to reside anywhere on the line striper. The location of the motor 702 should not be used to limit the scope of the present invention.

It should be noted that while a rack-and-pinion assembly is shown in the accompanying figures for adjustment of the height of the spray gun, other height adjustment mechanisms are also envisioned.

Some non-limiting examples of height adjustments mechanisms that may be used are listed below:

- Mechanical linear actuators/Electro-mechanical actuators: Such mechanical linear actuators operate by converting rotary motion into linear motion, where non-limiting examples of such a conversion via mechanisms such as (but not limited to): screw actuators (e.g., leadscrew actuators, screw jack actuators, ball screw actuators, roller screw actuator, etc.), where by rotating an actuator's nut, the screw shaft moves in a line; wheel and axle actuators (e.g., hoist actuator, winch actuator, rack and pinion actuator, chain drive actuator, belt drive actuator, rigid chain actuator, and rigid belt actuator operate on the principle of the wheel and axle, etc.), where in such wheel and axle actuators a rotating wheel moves a cable, rack, chain or belt to produce linear motion; cam actuators. Electro-mechanical actuators are similar to mechanical actuators except with an additional component—electric motor, wherein the rotary motion of the motor is converted to linear displacement.
- Hydraulic actuators: Examples include hydraulic actuators or hydraulic cylinders that comprise a hollow cylinder with a piston within, where pressure applied to the piston generates force that can move an external object. Hydraulic actuators may be controlled by a hydraulic pump.
- Pneumatic actuators: Pneumatic actuators, or pneumatic cylinders use compressed gas to generate force (in lieu of a liquid, as is the case of hydraulic actuators). While pneumatic actuators are possible, it should be noted that they may be large, bulky, and loud, and may also be prone to leaks.

Piezoelectric actuators: In piezoelectric actuators, an electric field (or voltage) is applied, which induces a strain or displacement in a given direction.

Twisted and coiled polymer (TCP) actuators or super-coiled polymer (SCP) actuator, which involves a coiled polymer that can be actuated by electric power.

Linear motors: A linear motor is functionally the same as a rotary electric motor with the rotor and stator circular magnetic field components laid out in a straight line. Since the motor moves in a linear fashion, no lead screw is needed to convert rotary motion to linear motion.

Telescoping linear actuator: Telescoping linear actuators are typically made of concentric tubes that extend and retract like sleeves, much like a telescopic cylinder. Other more telescoping actuators exit where actuating members act as rigid linear shafts when extended, but break that line by folding, separating into pieces and/or uncoiling when retracted. Non-limiting examples of telescoping linear actuators include: helical band actuator, rigid belt actuator, rigid chain actuator, and segmented spindle.

Figure 4:
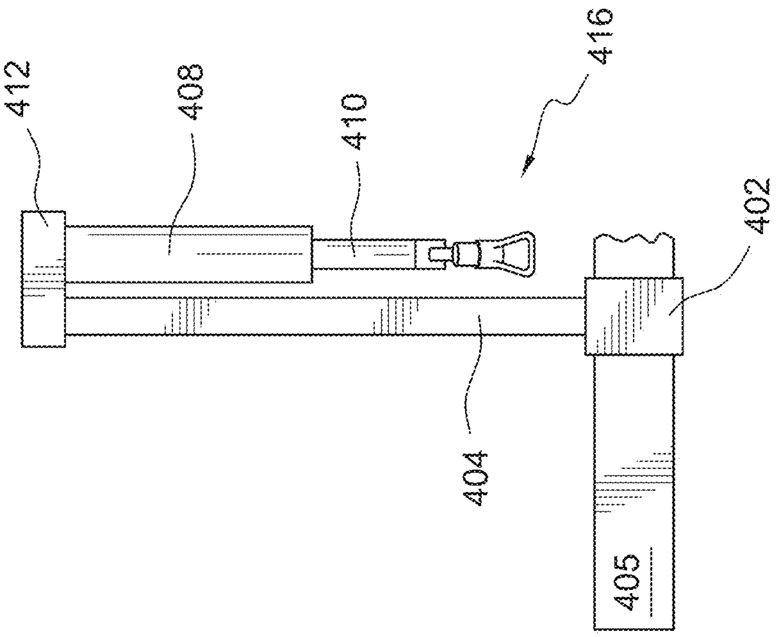
FIGS. 4 and 5(A)-(B) illustrate another non-limiting example of a height adjustment mechanism for a spray head in a line striper.
Figures 5A, 5B:
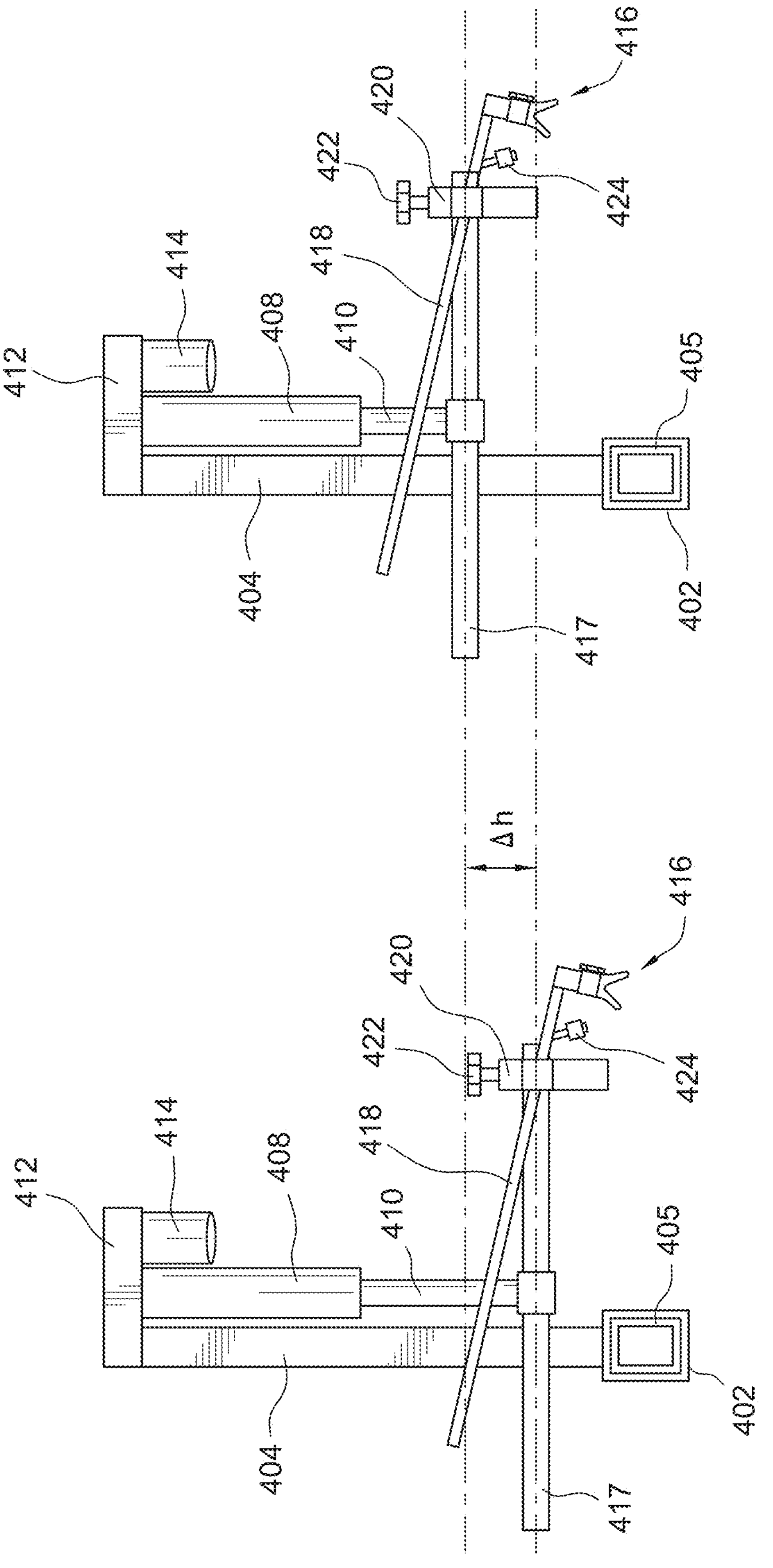

FIG. 4 depicts a rear view of an example of a linear actuator used as the height adjustment mechanism. FIGS. 5(A) and 5(B) depict a side view of the same linear actuator that is used as the height adjustment mechanism. In FIG. 4 and FIGS. 5(A) and 5(B), a generally horizontal platform 412 has a first, generally vertical, element 404 that has the horizontal platform 412 attached at one end and a hollow tube portion 402 attached at the other end. While elements 402, 404, and 412 are shown as separate elements, they could be made as a single element, or they could be made in twos (i.e., 402 and 404 as a single element and 412 as another single element, and other variations thereof). The hollow tube portion 402 slides onto a spray gun mount tube 405 of a line striper to hold everything in place.

It should be noted that while it is shown where the hollow tube portion 402, which is slightly larger in dimension slides over the spray gun mount tube 405, it could just as easily be made where hollow tube portion 402 contains a portion of another tube located within it, where at least another portion of the remainder of the another tube is inserted inside the spray gun mount tube 405. The shape of the hollow tube portion/spray gun mount tube or the specific manner in which the hollow tube is mounted to the spray gun mount tube should not be used to limit the scope of the invention.

The generally horizontal platform 412 supports a generally vertical housing 408 which has within a rod 410 which variably (i.e., variable in the length that protrudes out of the housing 408) extends in and out of the housing 408 based on the operation of a motor 414 (e.g., a brushed D.C. motor) which is controlled by the previously described control device. Spray gun mount bar 417 is attached to rod 410, for example, another hollow tube or a clamp. The spray gun 416 is retained within a gun holder assembly 420 that may either be part of, or is attached to, the spray gun mount bar 417. A knob 422 may be provided in the gun holder assembly 420 which may be rotated to securely hold the spray gun 416 in place.

In practice, the operator uses the previously described control device to raise or lower the spray gun 416 (retained in the gun holder assembly 420) on the spray gun mount bar 417. FIG. 5(B) depicts a rising operation where the motor 414 controls the stroke length of the rod 410 and shortens it by Δh (as compared to the height in FIG. 5(A)) according to a signal received (either over a wire or wirelessly) from the previously described control device.

In one embodiment, one or more cameras 424 may be mounted, for example, on the spray gun mount bar 417. Camera(s) 424 may be mounted elsewhere on the line striper as long as the placement location of such camera provides a clear view of the striping operation. The location of the camera(s) 424 should not be used to limit the scope of the present invention. Camera(s) 424 may be provided for viewing the striping operation on a display that may be part of the previously described control device or on a display that is separate from the previously described control device. For example, the control device may be a smartphone or tablet and the output of the camera may be viewed on the smartphone or tablet. As another example, the control device may be as shown in FIGS. 20(A)-(C) where view of the striping operation may be wirelessly transmitted to an external device such as a smart phone or tablet that the operator carries to view the striping operation. Such wireless transmission (for transmitting camera data to a display or for sending camera commands from the control device to the camera 424) may be accomplished via, for example, a Bluetooth® transmitter or transceiver that is part of the camera 424.

It should be noted that while a separate motor 414 is shown for illustration purposes, such a motor 414 can be made to be part of housing 408 or can be made to be within the generally horizontal platform 412. The location of the motor 414 should not be used to limit the scope of the present invention.

Figure 33:
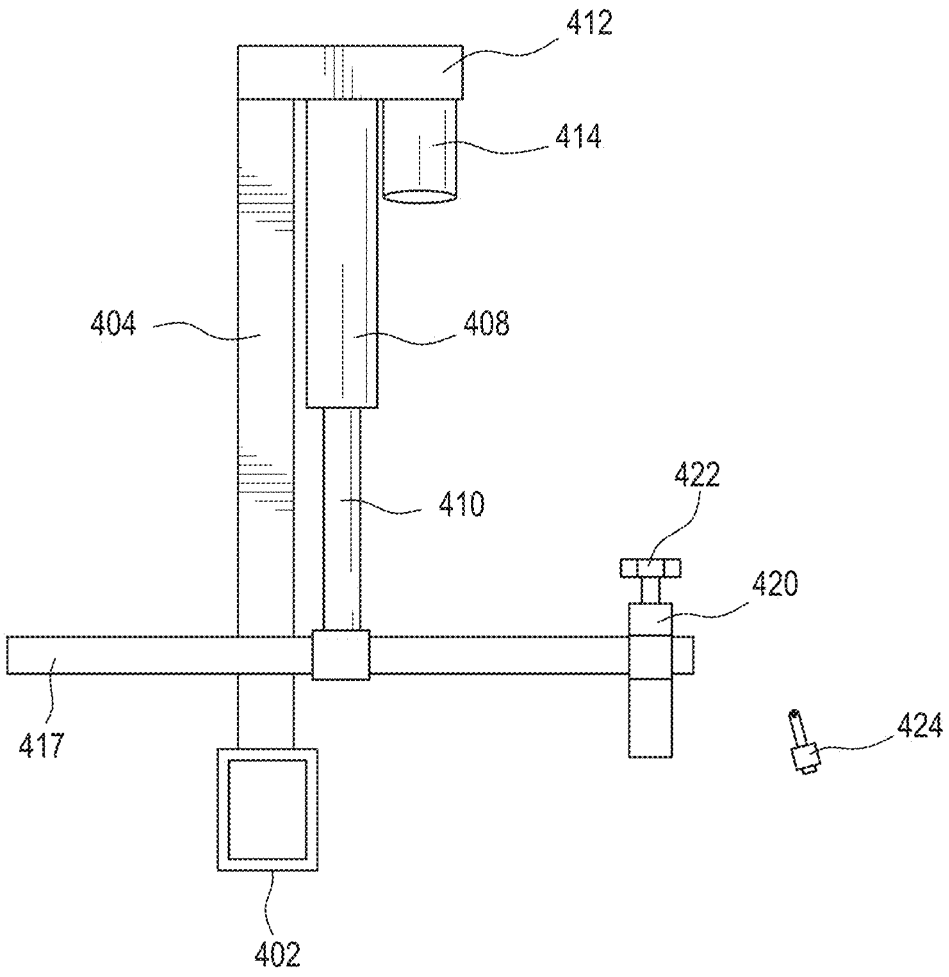
FIGS. 33-35 depict various kits that may be sold for height adjustment and/or angular adjustment of the spray head.

FIG. 33 depicts an example kit that may be sold for height adjustment of the spray gun, where the kit may be mounted onto an existing line striper system. The control device (e.g., as shown in 20(A) through (C)) may also be included as part of the kit.

Figure 26:
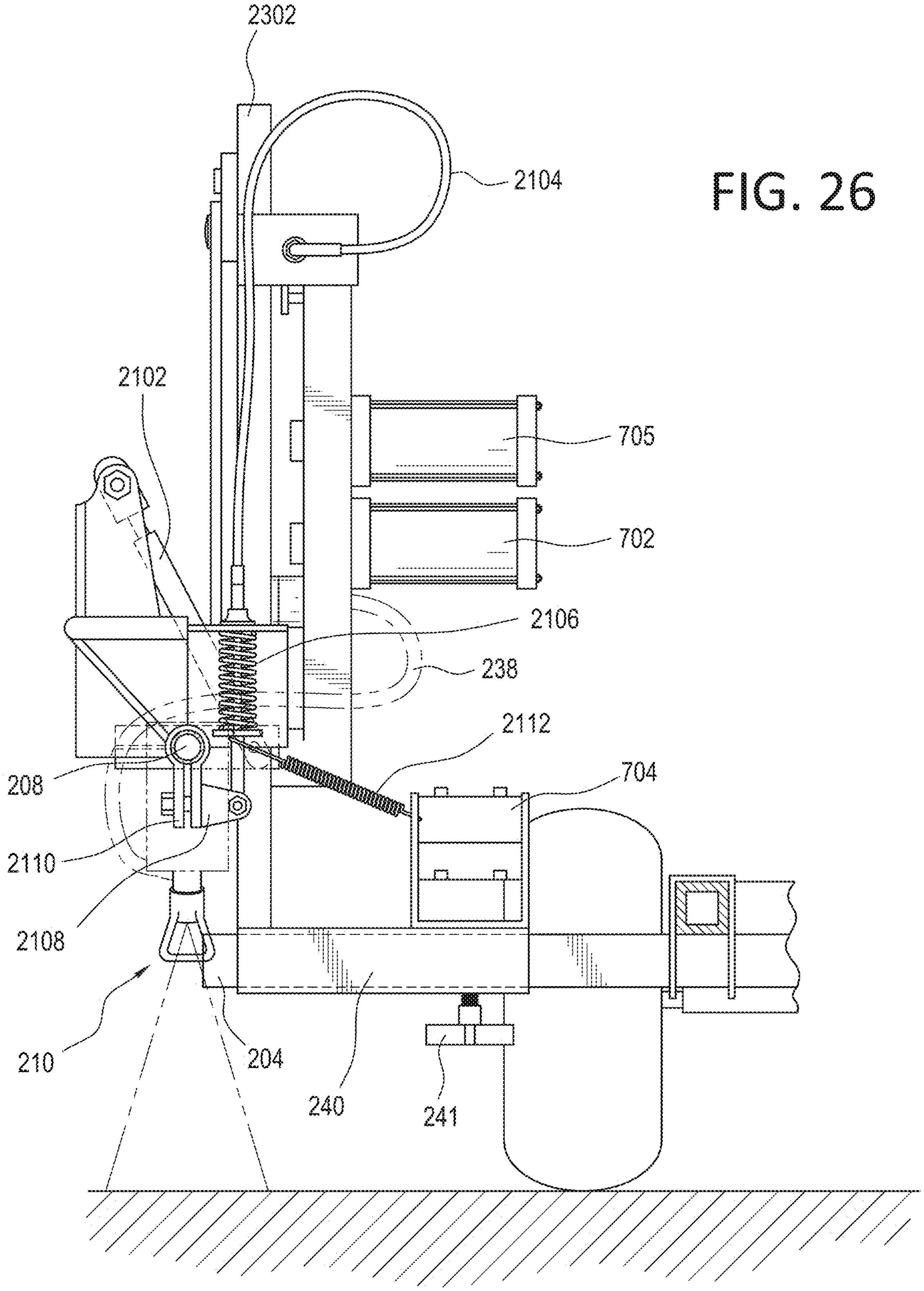

As shown in FIGS. 2-3, in one embodiment, in addition to being able to adjust the height of the spray gun as described above, one can angularly adjust the orientation of the spray gun. FIGS. 23, 24, and 26 depict a motor 705, which imparts a pushing or pulling force on cable 2104. The cable 2104 is connected to spring 2106, which is connected to element 2108, which in turn is connected to clamp 2110. Clamp 2110 is fit around the spray gun mount bar 208, with element 2108 attached to the clamp 2110 on one side. Element 2108 allows the spring to be connected to the clamp 2110. When a pushing force is imparted on the cable 2104 by motor 705, it imparts the force on elements 2108 and 2110 which causes a rotational movement in the spray gun mount bar, causing the spray head 210 to rotate.

FIG. 21 also depicts a gas strut arrangement 2102 (which is also called referred to as a gas spring, gas lift, pneumatic spring, or gas prop) which is used to reset the position of the spray gun back to a default position after it is moved rotationally. The gas strut arrangement 2102 is attached to a clamp 2402, which is fit around the spray gun mount bar 208 in the rear side as shown in FIG. 24. Movement of the rod in the gas strut arrangement 2102 causes rotational movement to be imparted to the spray gun mount bar 208. For example, in FIG. 23, if the cable 2104 is driven upwards by motor 705, which causes a rotation of the spray head 210 in a counter-clockwise direction. Once the striping operation requiring the angular rotation of the spray head 210 is complete, the tension in the cable 2104 is released (and, by extension, the tension in the spring 2106 is released). When such tension is released in the cable 2104, the gas strut arrangement 2102 provides a rotational force in a clockwise direction to position the spray head 210 back to a default position (e.g., at a vertical position with respect to the ground as shown in FIG. 23). Spring 2112 (as shown in FIGS. 23, 24, 26-28) is provided to maintain a tension in the direction of the spring 2112 and holds spring 2106 substantially steady so that the spray head 210 does not move around.

FIGS. 23, 24, 26, 28, and 30-32, all depict one or more power sources, which provides power for all electronics (e.g., cameras, motors, etc.) that are part of this invention. Wires emanating from the power sources to individual electronics are not shown for keeping the figures simple. Non-limiting examples of such power sources include portable rechargeable power supplies, batteries, etc. The type of power supply unit(s), the number of power supply unit(s), or the location of the power supply unit(s) should not be used to limit the scope of the present invention.

Figure 6B:
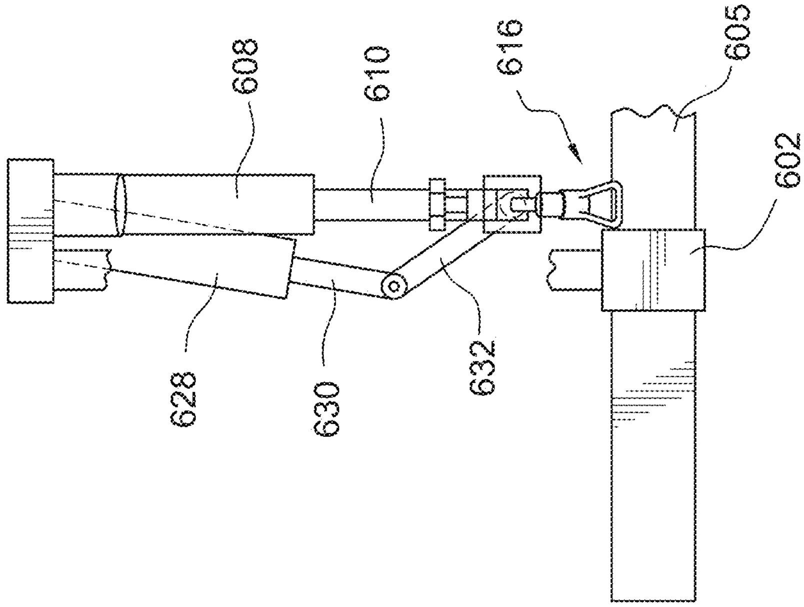
FIGS. 6(A)-(B) illustrate another non-limiting example of a height adjustment mechanism and angular adjustment mechanism for a spray head in a line striper
Figure 6A:
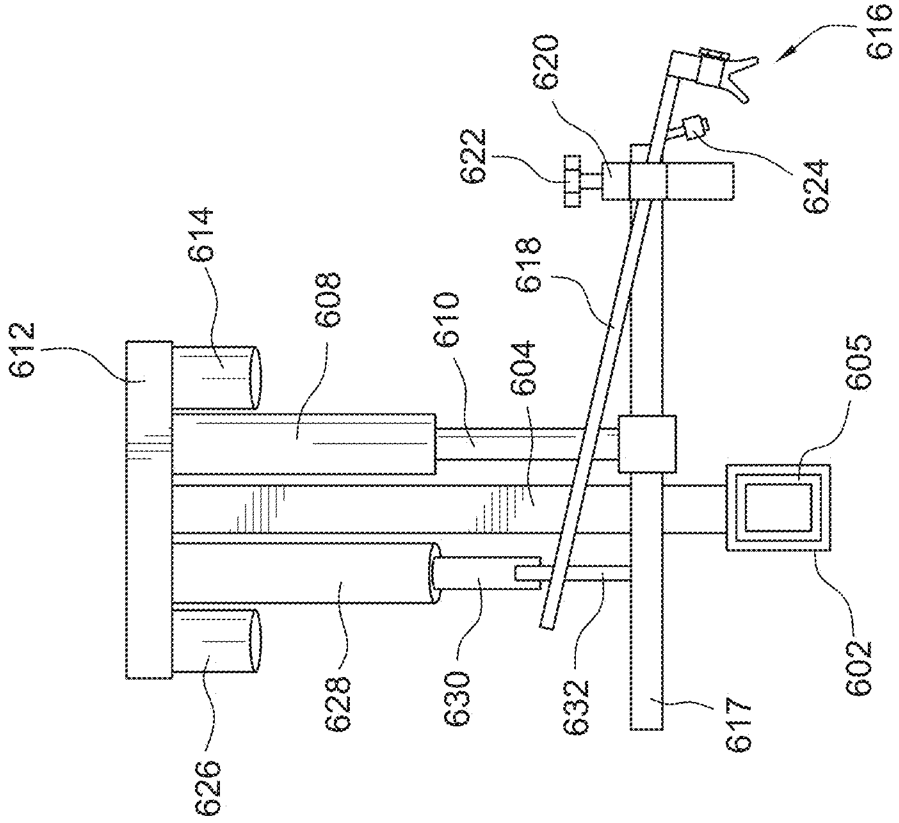

FIGS. 6(A) and 6(B) and FIGS. 7(A) through 7(F) depict another rotational adjustment mechanism for the spray head. FIGS. 6(A) and 6(B) depicts a front view of the same linear actuator that is used as the height adjustment mechanism. FIGS. 7(A) through 7(F) depict how a second linear actuator may be used to effect rotational motion of the spray head. In FIGS. 6(A) and 6(B) and FIGS. 7(A) through 7(F), the height adjustment is similar to that of FIGS. 4, 5(A), and 5(B). In FIGS. 6(A) and 6(B), a generally horizontal platform 612 has a first, generally vertical, element 604 that has the horizontal platform 612 attached at one end and a hollow tube portion 602 attached at the other end. While elements 602, 604, and 612 are shown as separate elements, they could be made as a single element, or they could be made in twos (i.e., 602 and 604 as a single element and 612 as another single element, and other variations thereof). The hollow tube portion 602 slides onto a spray gun mount tube 605 of a line striper to hold everything in place.

It should be noted that while it is shown where the hollow tube portion 602, which is slightly larger in dimension slides over the spray gun mount tube 605, it could just as easily be made where hollow tube portion 602 contains a portion of another tube located within it, where at least another portion of the remainder of the another tube is inserted inside the spray gun mount tube 605. The shape of the hollow tube portion/spray gun mount tube or the specific manner in which the hollow tube is mounted to the spray gun mount tube should not be used to limit the scope of the invention.

The generally horizontal platform 612 supports a generally vertical housing 608 which has within a rod 610 which variably (i.e., variable in the length that protrudes out of the housing 608) extends in and out of the housing 608 based on the operation of a motor 614 (e.g., a brushed D.C. motor) which is controlled by the previously described control device. Spray gun mount bar 617 is attached to rod 610 via, for example, another hollow tube or a clamp. The spray gun 616 is retained within a gun holder assembly 620 that may either be part of, or is attached to, the spray gun mount bar 617. A knob 622 may be provided in the gun holder assembly 620 which may be rotated to securely hold the spray gun 616 in place.

In practice, the operator uses the previously described control device to raise or lower the spray gun 616 (retained in the gun holder assembly 620) on the spray gun mount bar 617. FIG. 5(B) depicts a rising operation where the motor 614 controls the stroke length of the rod 610 and shortens or lengthens it to raise or lower the spray gun 616.

In one embodiment, one or more cameras 624 may be mounted, for example, on the spray gun mount bar 617. Camera(s) 624 may be mounted elsewhere on the line striper as long as the placement location of such camera provides a clear view of the striping operation. The location of the camera(s) 624 should not be used to limit the scope of the present invention. Camera(s) 624 may be provided for viewing the striping operation on a display that may be part of the previously described control device or on a display that is separate from the previously described control device. For example, the control device may be a smartphone or tablet and the output of the camera may be viewed on the smartphone or tablet. As another example, the control device may be as shown in FIGS. 20(A)-(C) where view of the striping operation may be wirelessly transmitted to an external device such as a smart phone or tablet that the operator carries to view the striping operation. Such wireless transmission (for transmitting camera data to a display or for sending camera commands from the control device to the camera 624) may be accomplished via, for example, a Bluetooth® transmitter or transceiver that is part of the camera 624.

A second linear actuator is provided to control the rotation of the spray head 616. The generally horizontal platform 612 supports another generally vertical housing 628 which has within a rod 630 which variably (i.e., variable in the length that protrudes out of the housing 628) extends in and out of the housing 628 based on the operation of another motor 626 (e.g., a brushed D.C. motor) which is controlled by the previously described control device. Rod 630 is connected to another rod 632, which in turn is connected to the spray gun mount bar 617. This setup converts the linear motion of the actuator (elements 626, 628 and 630) into a rotational motion that is used to rotate the spray gun mount bar 617 holding the spray head 616.

Figures 7A, 7B, 7C, 7D, 7E, 7F:
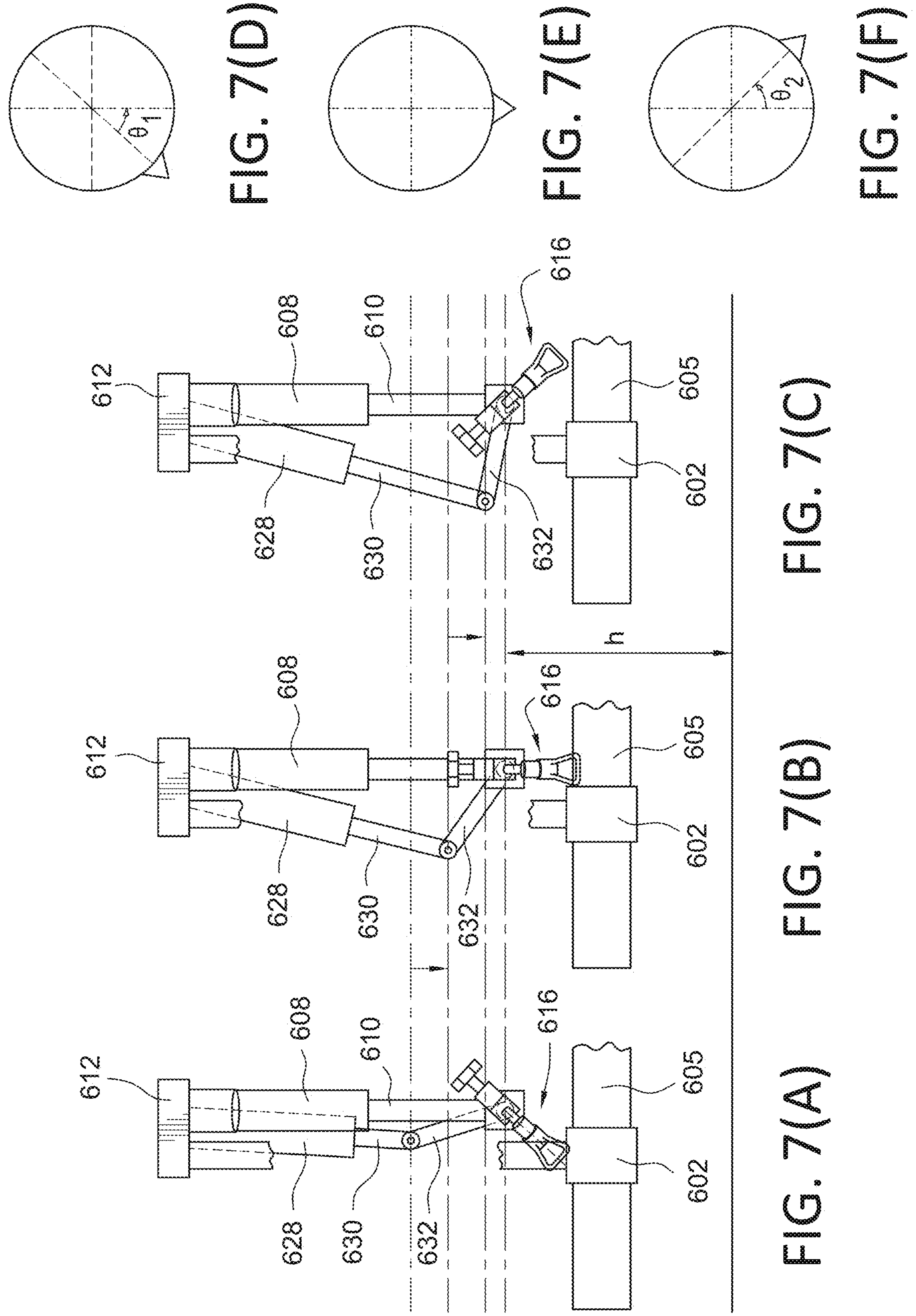
FIGS. 7(A)-(F) illustrate the rotational movement of the spray head based on linear movement of element 630 in FIGS. 6(A)-(B).

FIGS. 7(A) through 7(C) illustrate an example of how such rotational motion is achieved. FIG. 7(A) depicts the rod 630 at a starting position where the spray head 616 is disposed at an angle given by $\theta_1$. FIG. 7(D) depicts a simplified diagram showing the angle $\theta_1$ disposed by the spray head 616 shown as the triangle. FIG. 7(B) depicts the rod 630 that has moved below to a new position (based on rod 630 extending out of housing 628 by a predetermined amount) where the spray head 616 is now disposed substantially vertical with regards to the horizontal surface. FIG. 7(E) depicts a simplified diagram showing the spray head 616 is now disposed substantially vertical where the spray head 616 is again shown as a triangle. FIG. 7(C) depicts the rod 630 that has again moved below to another new position (based on rod 630 extending even more out of housing 628 by a predetermined amount) where the spray head 616 is now disposed at another angle given by $\theta_2$. FIG. 7(F) depicts a simplified diagram showing the angle $\theta_2$ disposed by the spray head 616 shown as the triangle.

It should be noted that while separate motors 614 and 626 are shown for illustration purposes, such motors 614 and 626 can be made to be part of housings 608 and 628, respectively, or can be made to be within the generally horizontal platform 612. The location of the motors 614 and 626 should not be used to limit the scope of the present invention.

Figure 34:
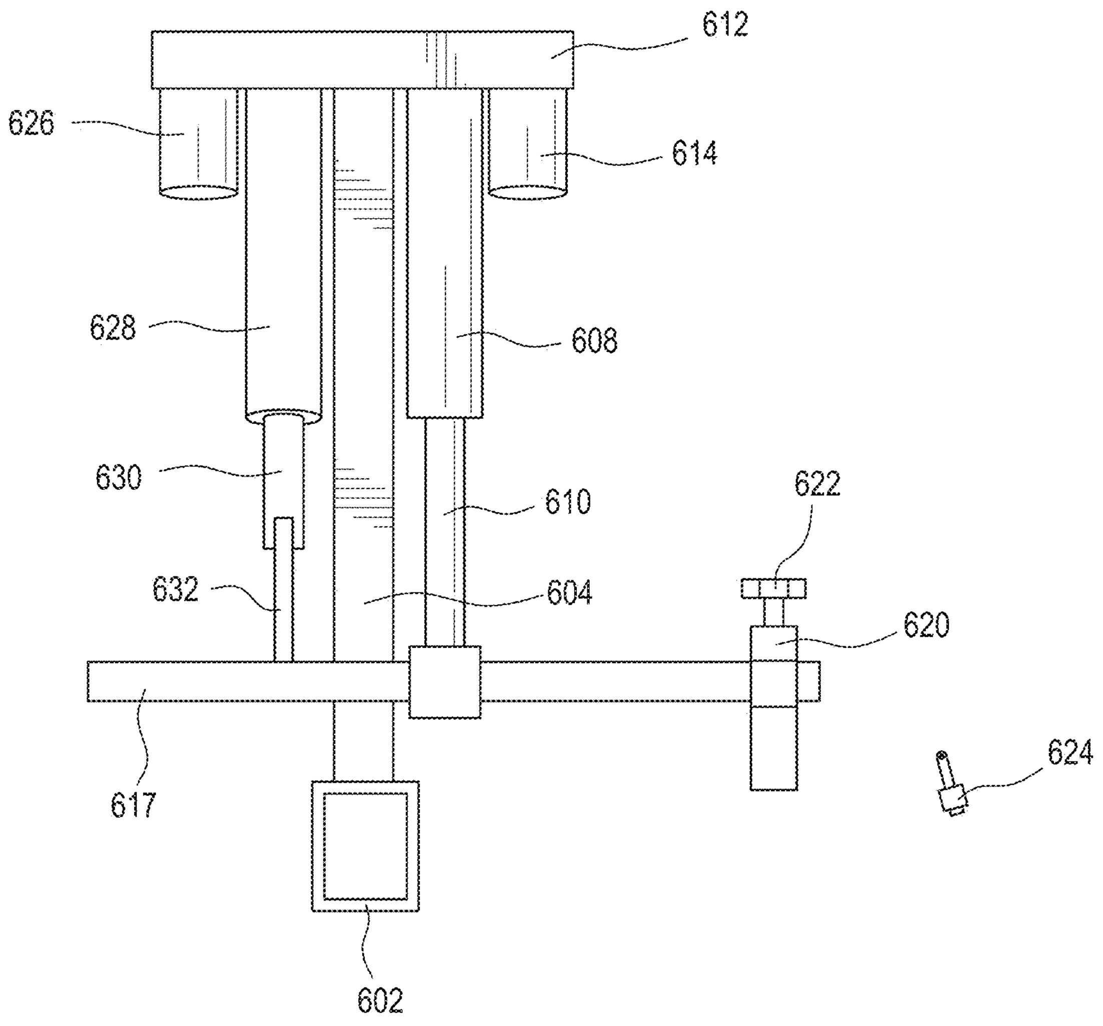

FIG. 34 depicts an example kit that may be sold for both height and rotational adjustment of the spray gun, where the kit may be mounted onto an existing line striper system. The control device (e.g., as shown in 20(A) through (C)) may also be included as part of the kit.

Figure 8B:
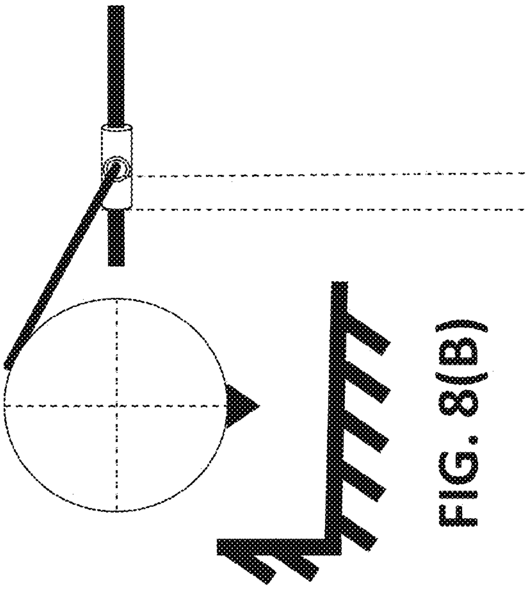
FIGS. 8(B) and 8(C) depict another non-limiting example showing how the rotational motion of a mechanism such as a linear sliding mechanism may be used to rotate the spray head in a clockwise or counter-clockwise manner.
Figure 8C:
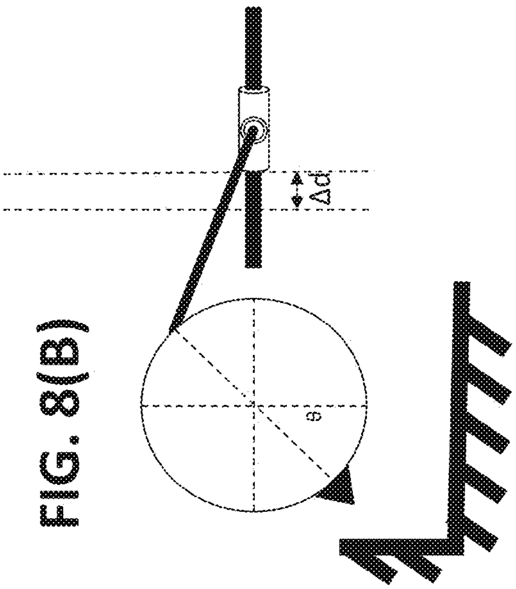
Figure 8A:
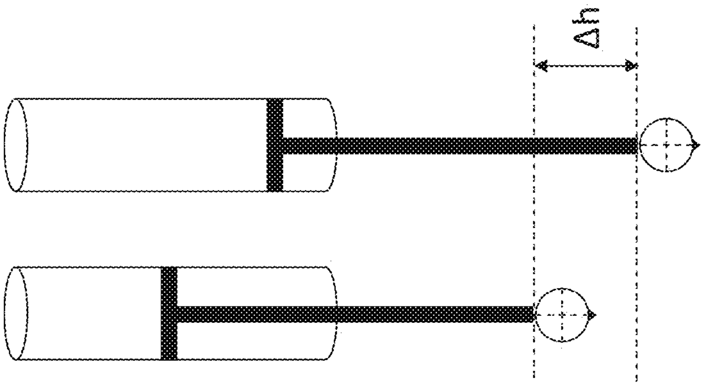
FIG. 8(A) depicts a non-limiting example showing how the linear motion of a mechanism such as a piston-based mechanism may be used to raise or lower the spray gun mount bar having the spray head.
Figure 9A:
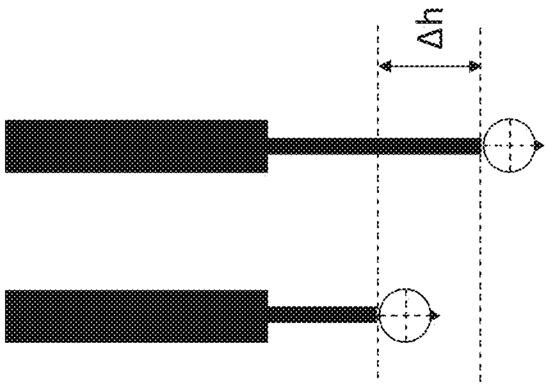
FIG. 9(A) depicts another non-limiting example where a linear motion is used to change the height of the spray gun mount bar having the spray head and FIGS. 9(B)-(C) depicts another non-limiting example where the rotational motion of a motor attached to a platform holding the spray head is used to rotate the spray head.
Figure 9B:
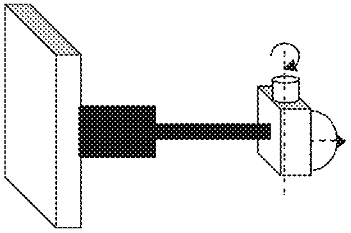
Figure 9C:
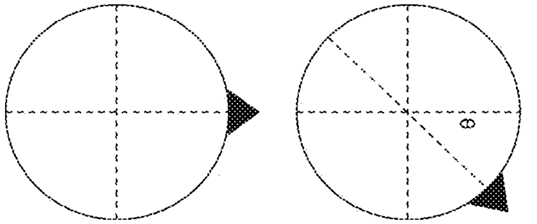

FIG. 8(A) depicts a simplified example showing how the linear motion of a mechanism such as a piston-based mechanism may be used to raise or lower the spray gun mount bar having the spray head. FIGS. 8(B) and 8(C) depicts another simplified example showing how the rotational motion of a mechanism such as a linear sliding mechanism may be used to rotate the spray head in a clockwise or counter-clockwise manner. FIG. 9(A) depicts another example where a linear motion is used to change the height of the spray gun mount bar having the spray head and FIGS. 9(B)-(C) depict another example where the rotational motion of a motor attached to a platform holding the spray head is used to rotate the spray head.

To help with precise line striping, one or two lasers may be mounted on the striper which allows one or more laser dots/points to be shown on the ground. The user may use the laser dot(s)/point(s) to precisely conduct the line striping operation. The one or more lasers may be mounted, for example, on the spray gun mount bar, or on the vertical element that holds the height adjustment mechanism, etc.

In one example, as depicted in FIGS. 13(A)-(B), 14(A)-(B), and 15(A)-(F), at least one laser is provided, where an operator can rotate the laser clockwise or counter-clockwise as part of his/her calibration or initializing effort of the laser so that the laser dot(s)/point(s) are in a desirable position prior to start of the line striping operation. Similarly, the operator may also be able to move the laser via, for example, a linear actuator or micro linear actuator, in a manner where the laser dot(s)/point(s) may be directed up or down and positioned in a desirable spot prior to the start of the line striping operation.

Figure 13B:
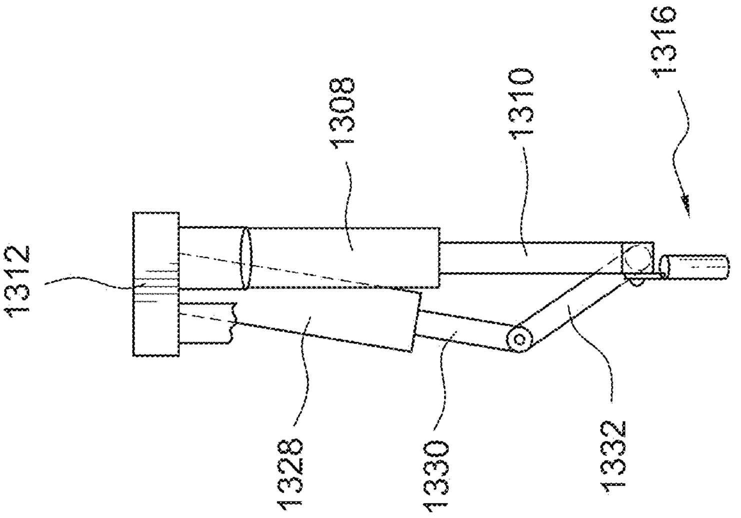
FIGS. 13(A)-(B), 14(A)-(B), and 15(A)-(F) depict how the height and angular rotation of a laser and camera pair are controlled.
Figure 13A:
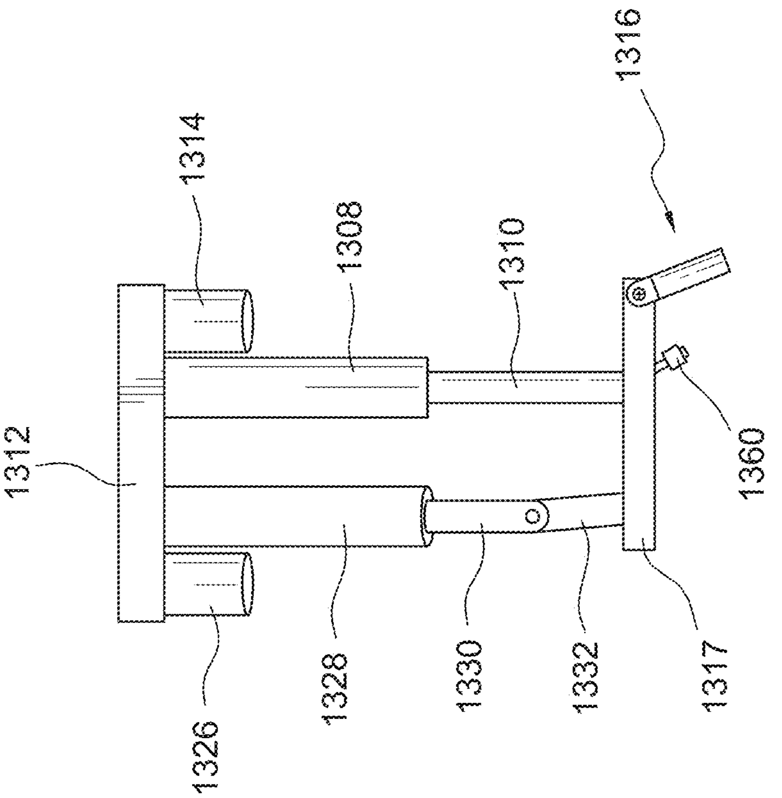

FIGS. 13(A) and 13(B) depict such a first micro linear actuator, where a generally horizontal platform 1312 (where the platform 1312 may be mounted on the striper) supports a generally vertical housing 1308 which has within a rod 1310 which variably (i.e., variable in the length that protrudes out of the housing 1308) extends in and out of the housing 1308 based on the operation of a motor 1314 (e.g., a brushed D.C. motor) which is controlled by a control device that is similar to the previously described control device. Rod 1317 having a laser 1316 at one end is attached to rod 1310. A second micro linear actuator is provided to control the rotation of the rod 1317. The generally horizontal platform 1312 supports another generally vertical housing 1328 which has within a rod 1330 which variably (i.e., variable in the length that protrudes out of the housing 1328) extends in and out of the housing 1328 based on the operation of another motor 1326 (e.g., a brushed D.C. motor) which is controlled by a control device that is similar to the previously described control device. Rod 1330 is connected to another rod 1332, which in turn is connected to the rod 1317. This setup converts the linear motion of the micro linear actuator (elements 1326, 1328 and 1330) into a rotational motion that is used to rotate the rod 1317 holding the laser 1316. A camera 1360 may also be provided to view the laser dot(s)/point(s) and help the operator place the laser dot(s)/point(s) in a desired location prior to the start of a striping operation.

Figures 14A, 14B:
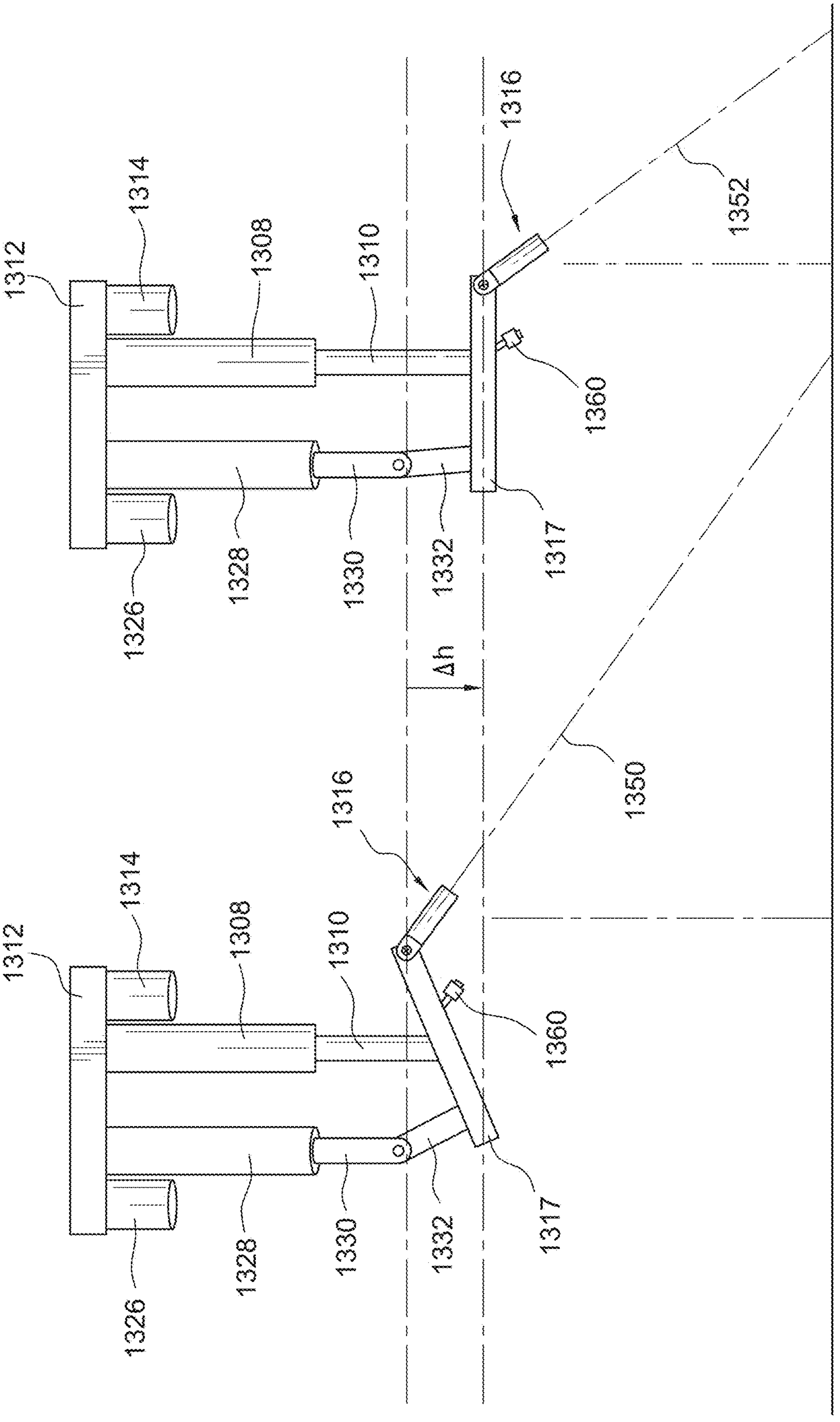

FIGS. 14(A)-(B) depict an operation where an operator moves the laser in a manner where the laser dot(s)/point(s) may be directed up or down and positioned in a desirable spot prior to the start of the line striping operation. FIG. 14(A) depicts the start position of the laser 1316, where the operator decides that the laser is too far away (as indicated by line 1350) and needs to be brought down closer to him/her near where the striping operation is to occur. FIG. 14(B) depicts the scenario where the operator issues one or more commands via a control device (similar to the control device described previously) which causes the micro linear actuator (elements 1308 and 1310) to lower by $\Delta h$ as shown where the laser dot(s)/point(s) are now in the desired location as indicated by line 1352.

Figures 15A, 15B, 15C, 15D, 15E, 15F:
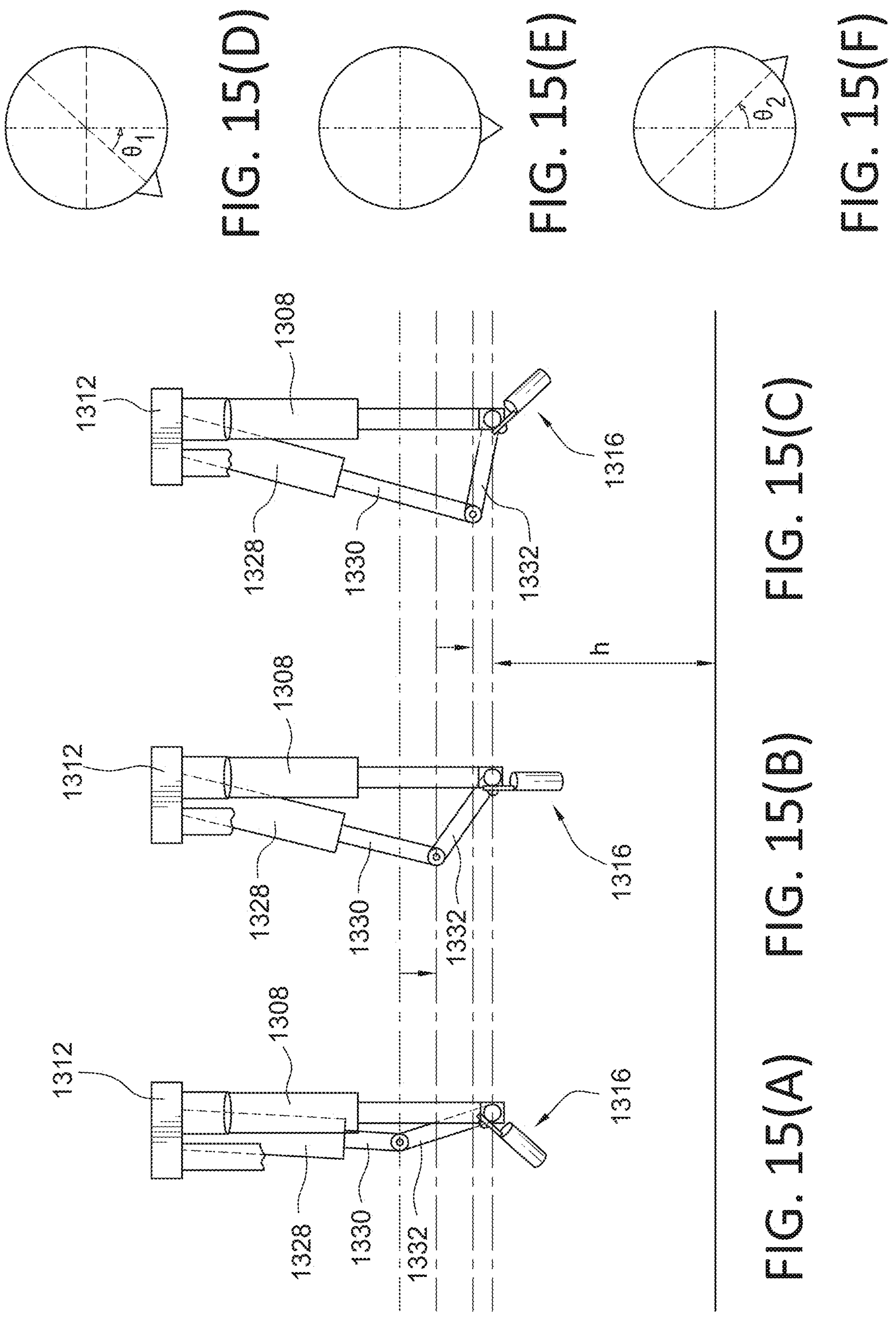

FIGS. 15(A)-(F) depict an operation where an operator rotates the laser to position the laser dot(s)/point(s) in a desired location prior to the start of a striping operation. FIGS. 15(A) through 15(C) illustrate an example of how such rotational motion is achieved. FIG. 15(A) depicts the rod 1330 at a starting position where the laser 1316 is disposed at an angle given by $\theta_1$. FIG. 15(D) depicts a simplified diagram showing the angle $\theta_1$ disposed by the laser 1316 shown as the triangle. FIG. 15(B) depicts the rod 1330 that has moved below to a new position (based on rod 1330 extending out of housing 1328 by a predetermined amount) where the laser 1316 is now disposed substantially vertical with regards to the horizontal surface. FIG. 15(E) depicts a simplified diagram showing the laser 1316 is now disposed substantially vertical where the laser 1316 is again shown as a triangle. FIG. 15(C) depicts the rod 1330 that has again moved below to another new position (based on rod 1330 extending even more out of housing 1328 by a predetermined amount) where the laser 1316 is now disposed at another angle given by $\theta_2$. FIG. 15(F) depicts a simplified diagram showing the angle $\theta_2$ disposed by the laser 1316 shown as the triangle.

It should be noted that while separate motors 1314 and 1326 are shown for illustration purposes, such motors 1314 and 1326 can be made to be part of housings 1308 and 1328, respectively, or can be made to be within the generally horizontal platform 1312. The location of the motors 1314 and 1326 should not be used to limit the scope of the present invention.

Figure 35:
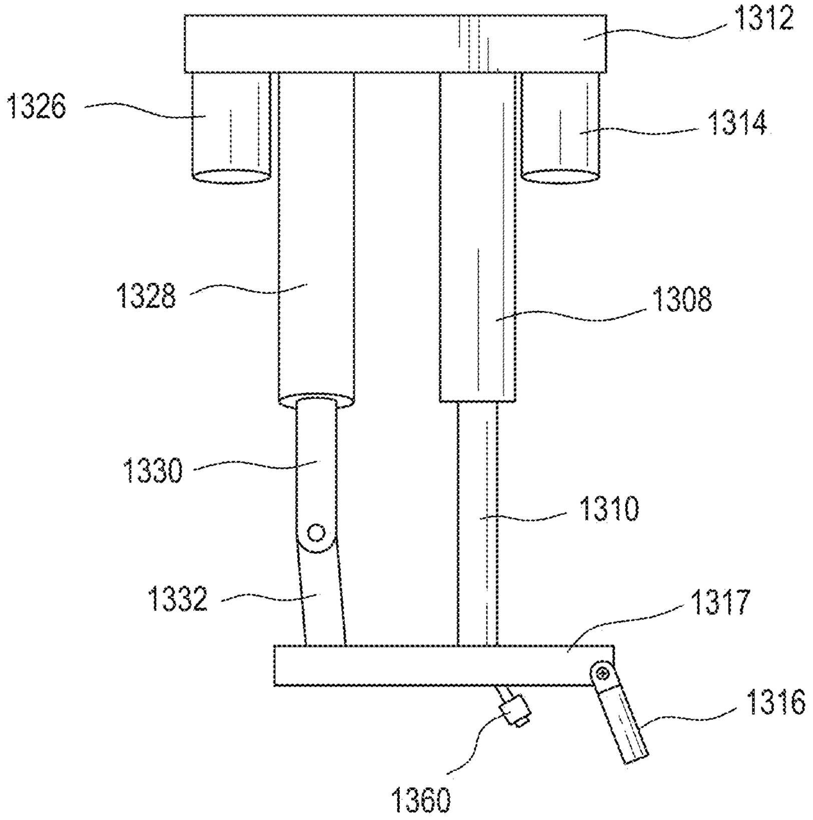

FIG. 35 depicts an example kit that may be sold for rotational and up/down adjustment of the laser, where the kit may be mounted onto an existing line striper system. The control device (e.g., as shown in 20(A) through (C)) may also be included as part of the kit.

Figure 10:
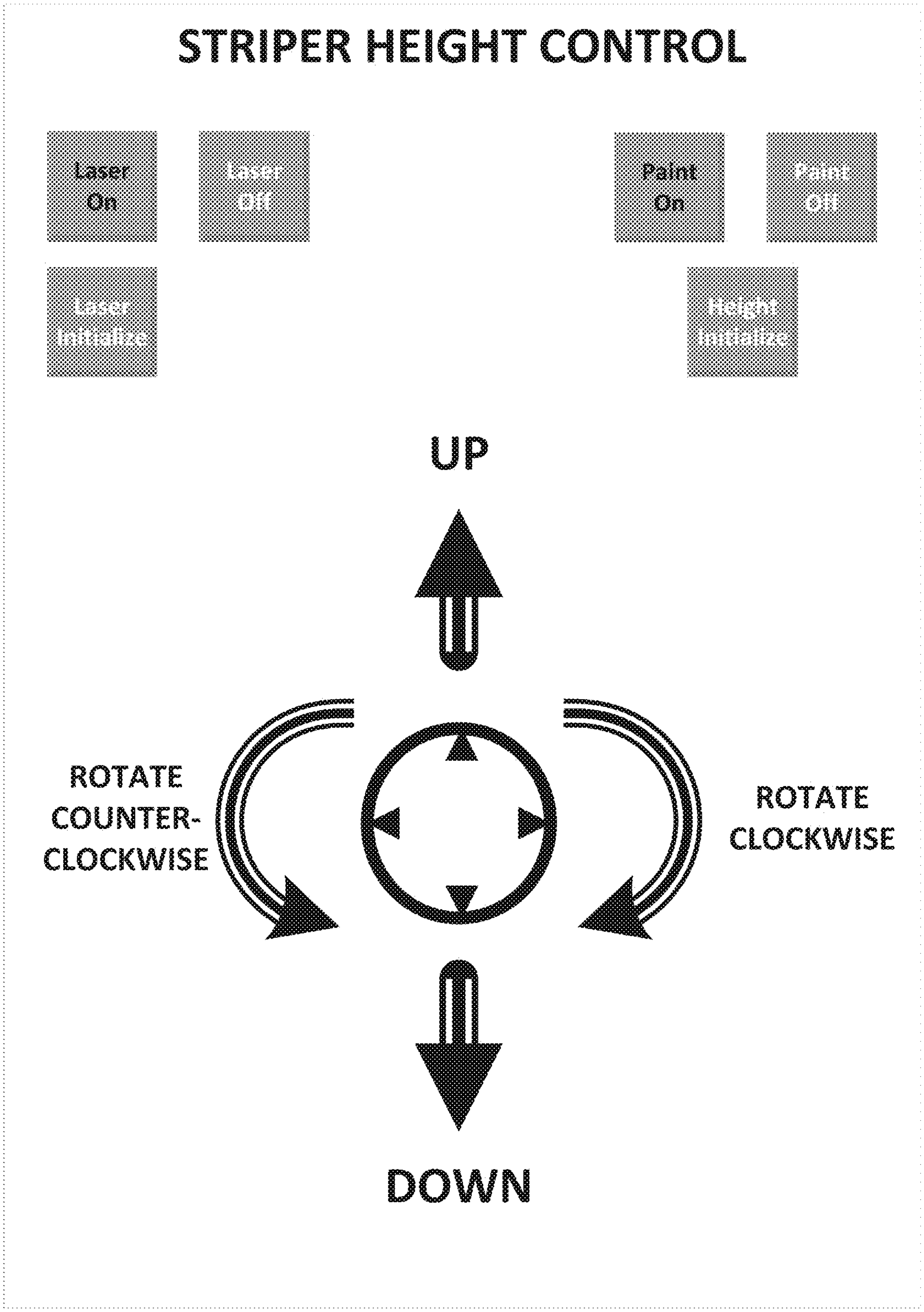
FIGS. 10-12 depict a non-limiting example of an interface of an application that is used to control various features described above, including changing the height of the spray gun mount bar having the spray head or rotating the spray gun mount bar having the spray head.
Figure 11:
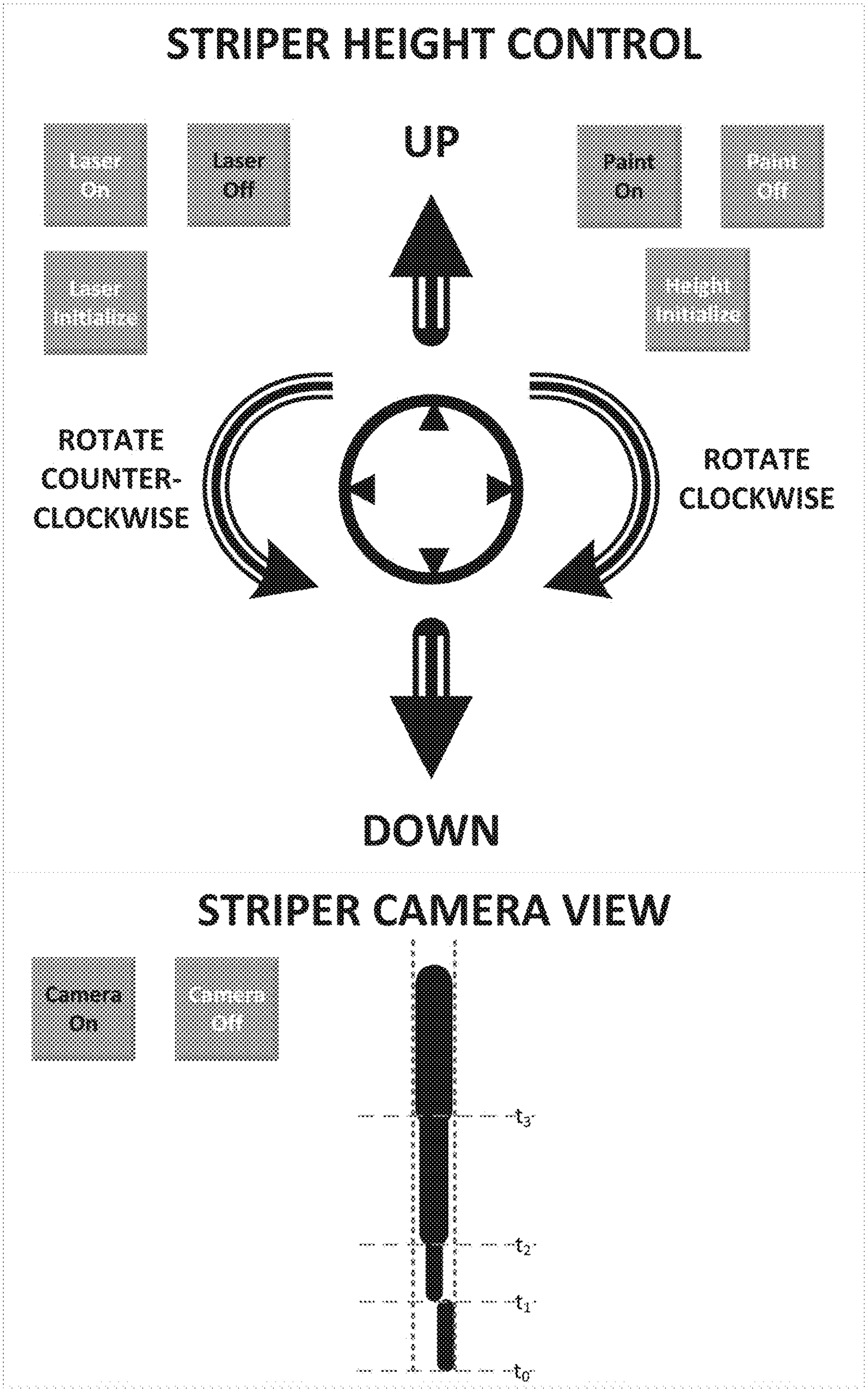
Figure 12:
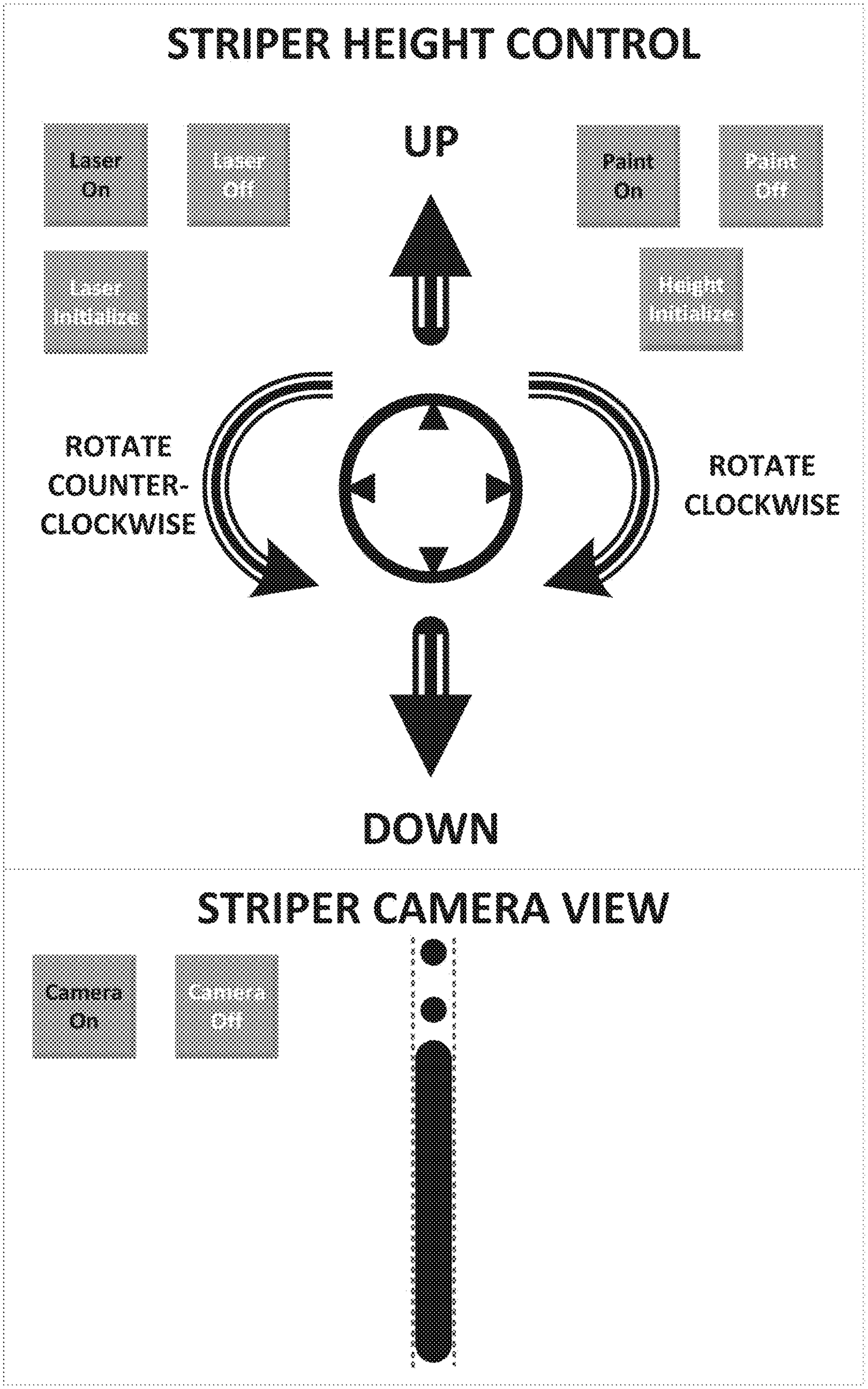

FIGS. 10-12 depict a non-limiting example of an interface of an application that is used to control various features described above, including changing the height of the spray gun mount bar having the spray head or rotating the spray gun mount bar having the spray head.

FIG. 10 depicts an example interface that comprises a striper height control section which comprises a plurality of buttons that may be activated by touch. The "Laser On"/"Laser Off" buttons may be depressed to turn on and off a laser that an operator may use to conduct a precise line striping operation. The "Laser Initialize" button may be depressed to initialize the laser's position to a default position. The "Height Initialize" button may be depressed to initialize the spray gun's height to a default position. The "Paint On"/"Paint Off" button may be depressed to turn on the paint for the striping operation. The depicted "UP" arrow (or the triangle pointing up in the circle) may be depressed to raise the spray gun. The depicted "DOWN" arrow (or the triangle pointing down in the circle) may be depressed to lower the spray gun. The depicted "ROTATE CLOCKWISE" arrow (or the triangle pointing right in the circle) may be depressed to rotate the spray gun clockwise. The depicted "ROTATE COUNTER-CLOCKWISE" arrow (or the triangle pointing left in the circle) may be depressed to rotate the spray gun counter-clockwise.

FIG. 11 depicts another example interface that comprises a striper height control section which comprises a plurality of buttons that may be activated by touch. The interface is similar to that of FIG. 10, with the exception of an additional camera view of the striping operation. The "Camera On" button is depressed to turn on the camera with a live view displayed on the screen as shown in FIG. 11. The sample live view shown depicts an operation which started at time, $t_0$, where the paint coming out of the spray gun is not centered and is not wide enough. First, at start of time $t_1$, the operator starts moving the spray head to a more centered location by rotating the spray head clockwise (by depressing the "ROTATE CLOCKWISE" arrow (or the triangle pointing right within the circle). The operator next adjusts the height of the spray head by depressing the "UP" button (or the arrow pointing up within the circle) and at time, $t_2$, the operator sees that the line is still not wide enough. The operator continues to adjust the height of the spray head by continuing to depress the "UP" button (or the arrow pointing up within the circle), where at the start of $t_3$, the desired line width is achieved.

FIG. 12 depicts another example interface which, in addition to the live view of the striping operation, shows one or more laser dot(s)/point(s) corresponding to a laser that is used for conducting a precise line striping operation.

Figure 16:
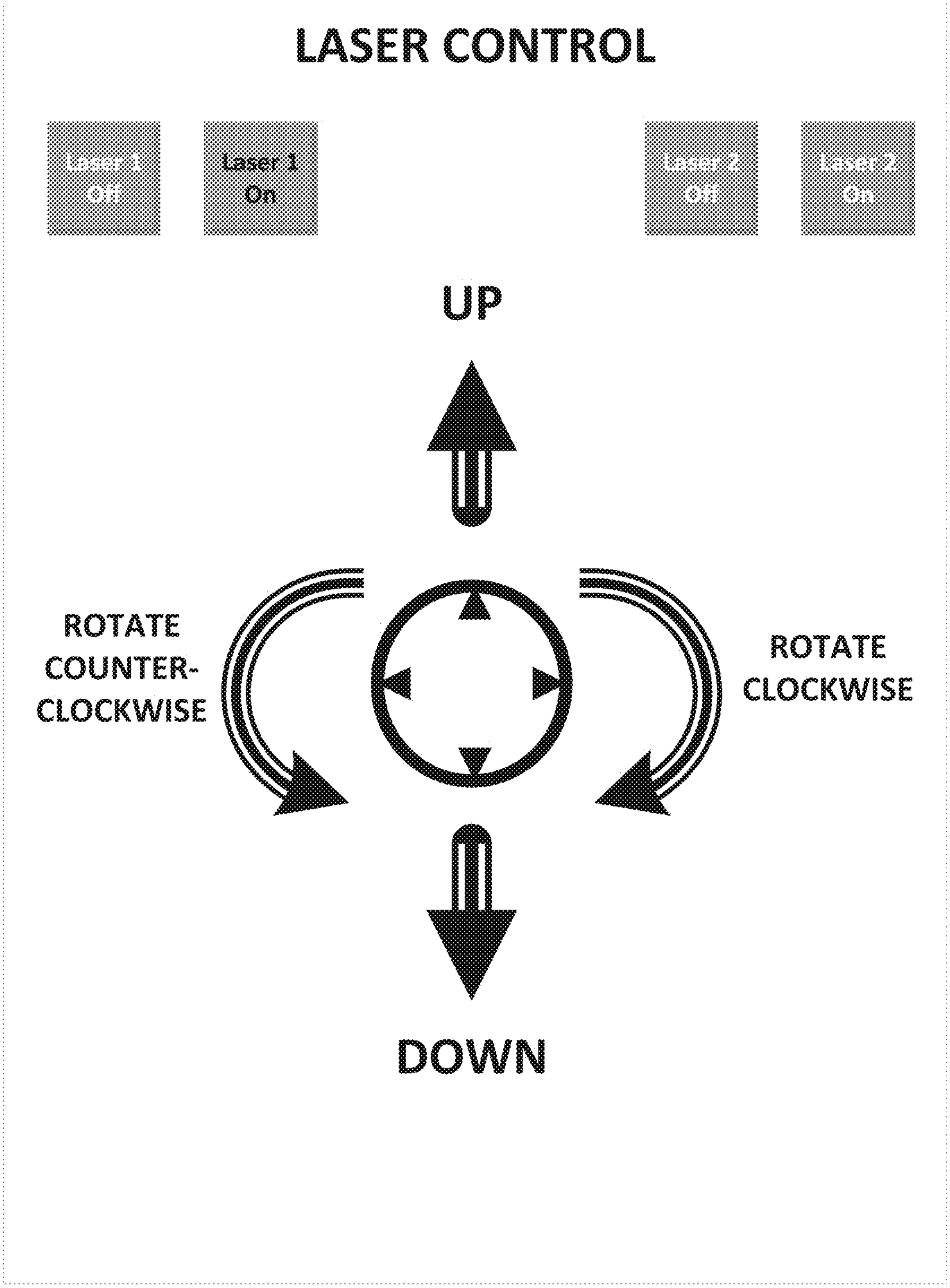
FIGS. 16-19 depict a non-limiting example of an interface of an application that is used to provide the operator with control over operating the laser and positioning the laser in a desired position prior to the start of the striping operation.

FIGS. 16-19 depict a non-limiting example of an interface of an application that is used to provide the operator with control over operating the laser and positioning the laser in a desired position prior to the start of the striping operation. FIG. 16 depicts an example interface that comprises a laser control section which comprises a plurality of buttons that may be activated by touch. The "Laser 1 On"/"Laser 1 Off" and "Laser 2 On"/"Laser 2 Off" buttons may be depressed to turn on and off a first laser and, if a second laser is available, the second laser, where an operator may use the lasers to conduct a precise line striping operation. The depicted "UP" arrow (or the triangle pointing up in the circle) may be depressed to move the laser dot(s)/point(s) away from the operator. The depicted "DOWN" arrow (or the triangle pointing down in the circle) may be depressed to move the laser dot(s)/point(s) towards the operator. The depicted "ROTATE CLOCKWISE" arrow (or the triangle pointing right in the circle) may be depressed to rotate the laser clockwise. The depicted "ROTATE COUNTER-CLOCKWISE" arrow (or the triangle pointing left in the circle) may be depressed to rotate the laser counter-clockwise.

Figure 17:
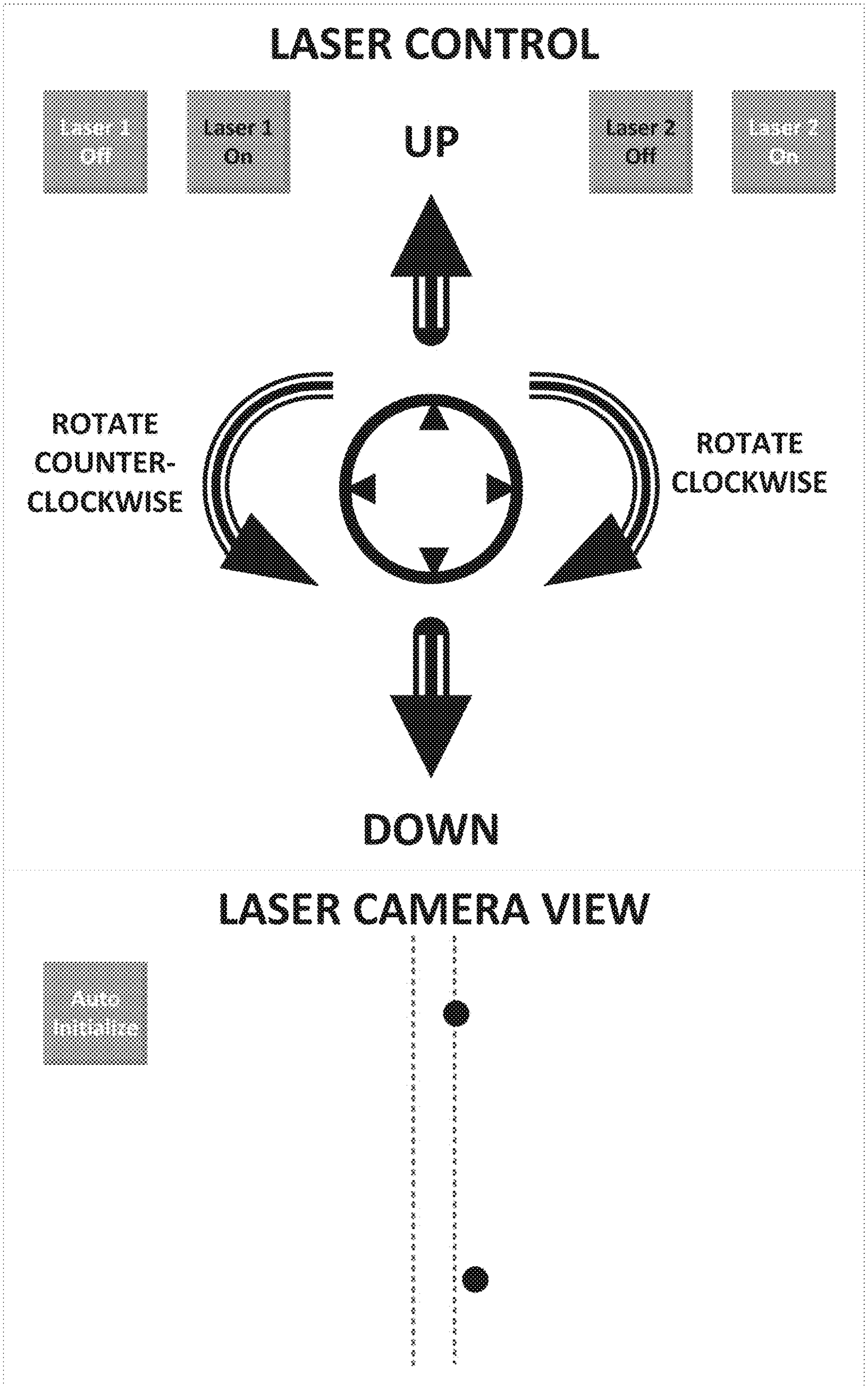
Figure 18:
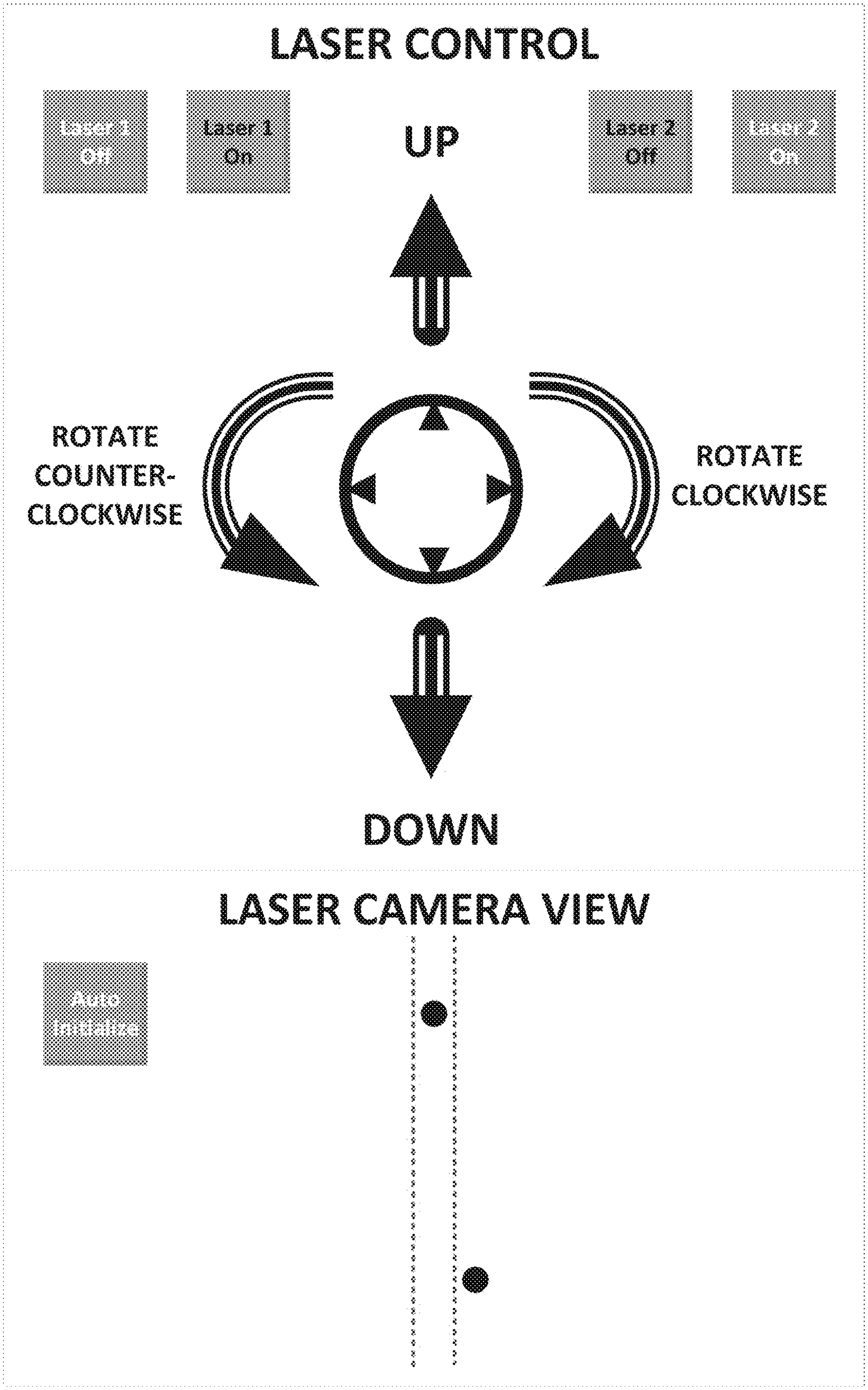
Figure 19:
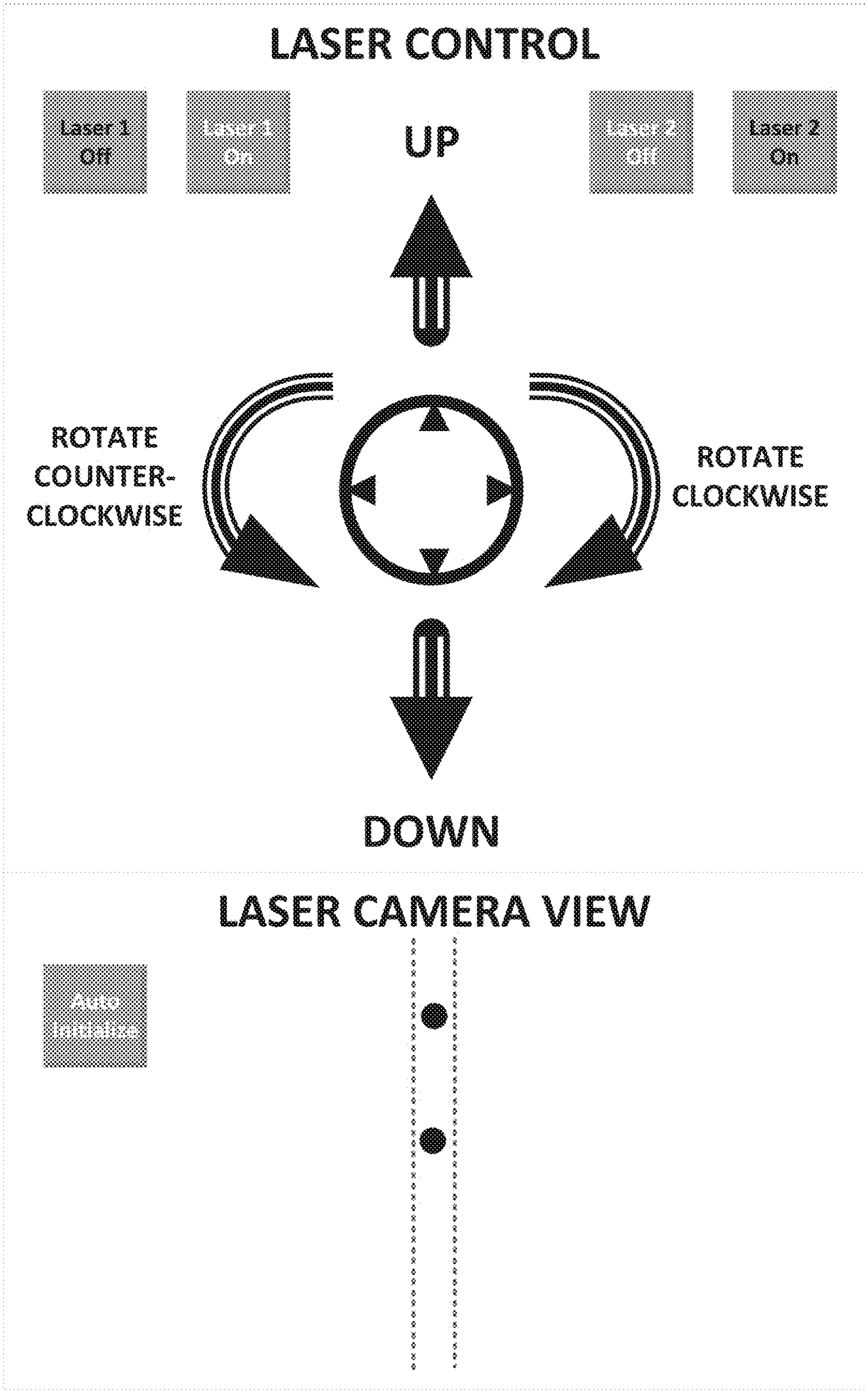

FIG. 17 depicts another example interface that is similar to the interface of FIG. 16, except that the interface in FIG. 17 also provides for a live view of the laser dot(s)/point(s) via a camera such as camera 1360. In this example, the first laser dot/point (associated with, for example, a first laser) on the top of the figure and the second laser dot/point (associated with, for example, a second laser) on the bottom of the figure are both not in a desired location. In FIG. 18, the operator, first, depresses the "Laser 1 On" button to pick the first laser and depresses "ROTATE CLOCKWISE" arrow in the interface to move the first laser dot/point corresponding to the first laser to the centered position shown in FIG. 18. In FIG. 19, the operator, next depresses the "Laser 2 On" button to pick the second laser and depresses "ROTATE CLOCKWISE" arrow in the interface to move the second laser dot/point corresponding to the second laser to the centered position. Next, the operator next depresses the "UP" arrow to move the second laser dot/point up to its final desired location, which is shown in FIG. 19. Now, when the line striping operation begins, the two laser dots/points guide the user in painting the line stripe precisely.

Many of the above-described features disclosed in the interfaces can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Figure 29:
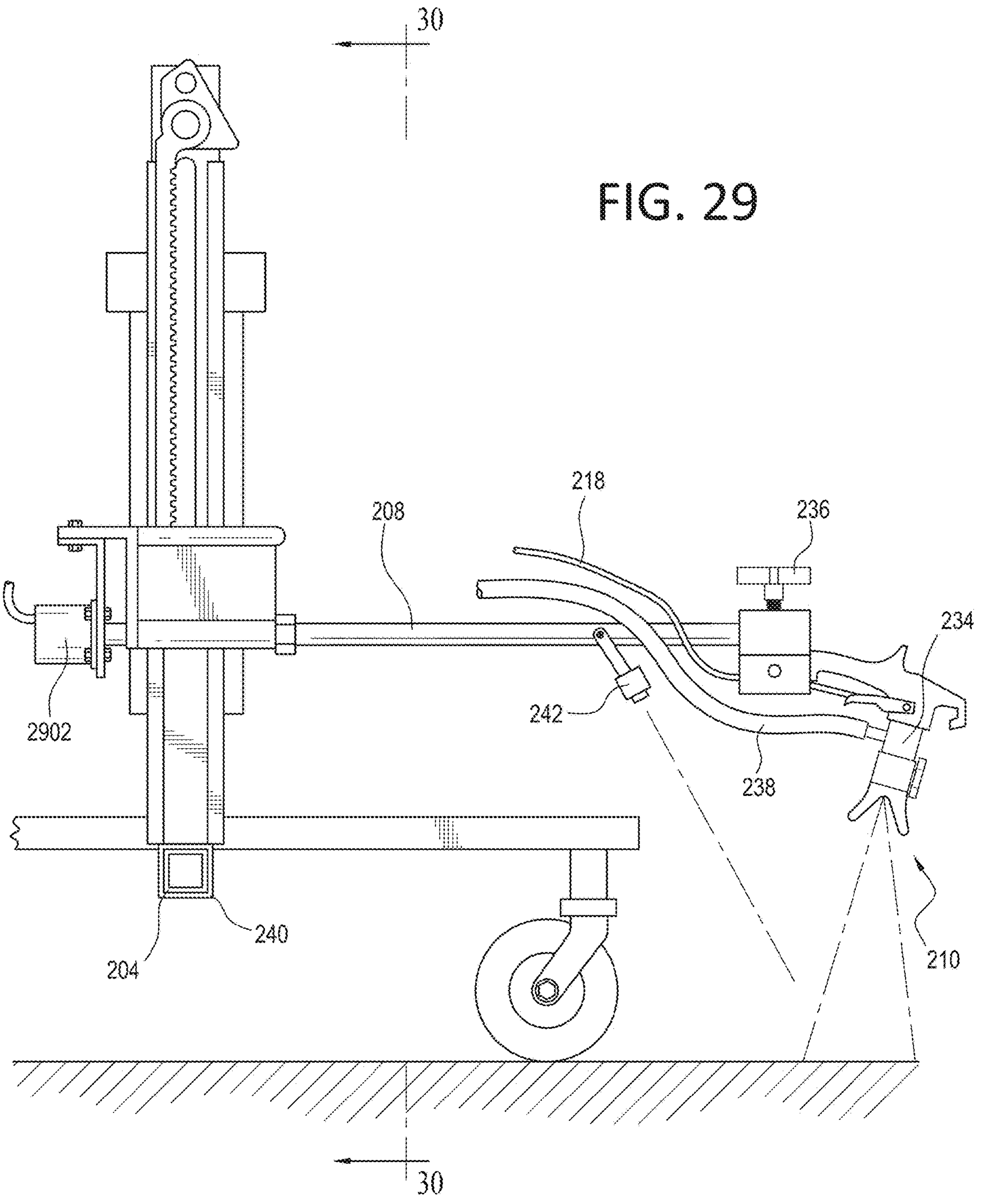
FIGS. 29-32 depict another example where the rotational movement is accomplished using a motor.
Figure 30:
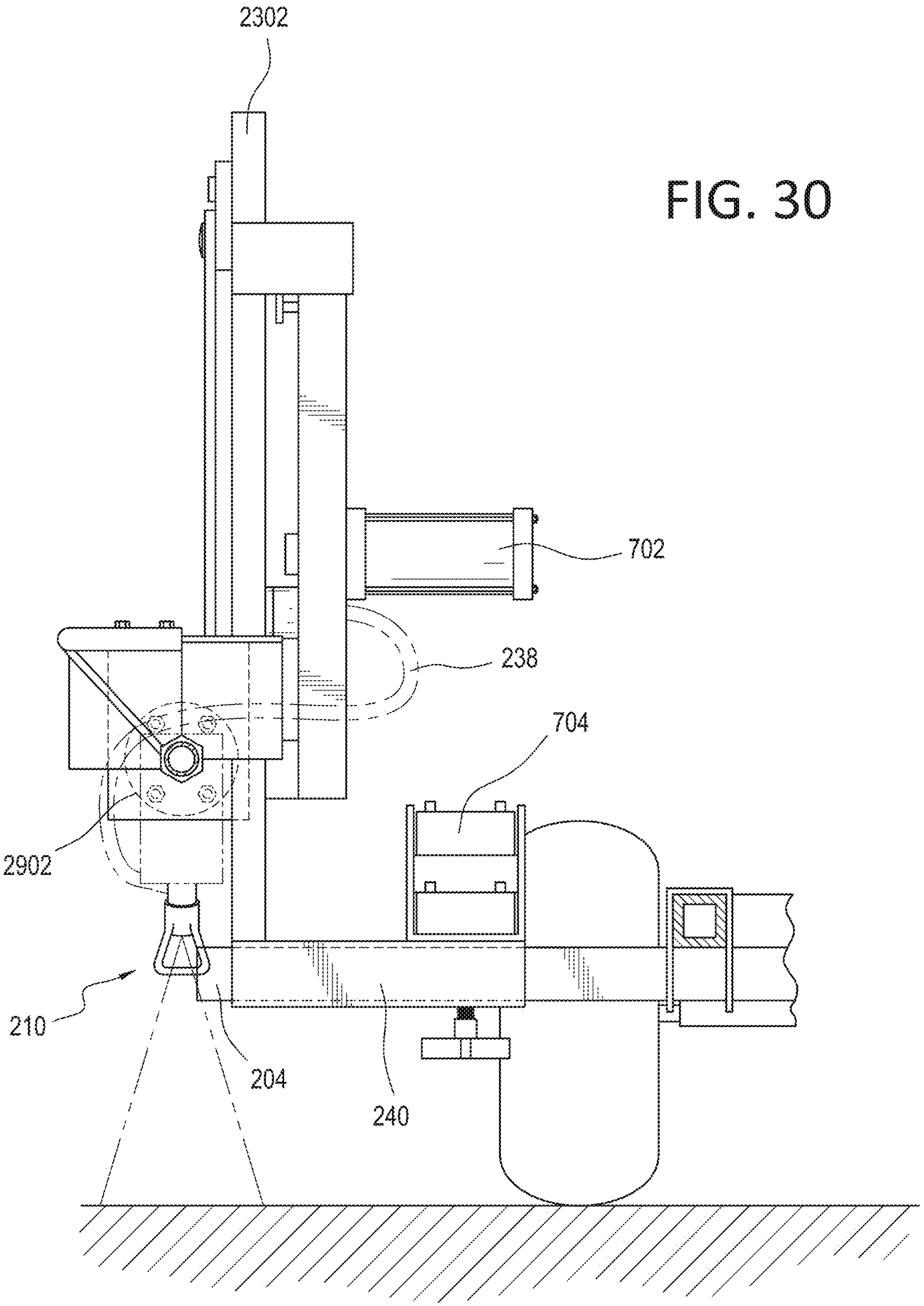
Figure 31:
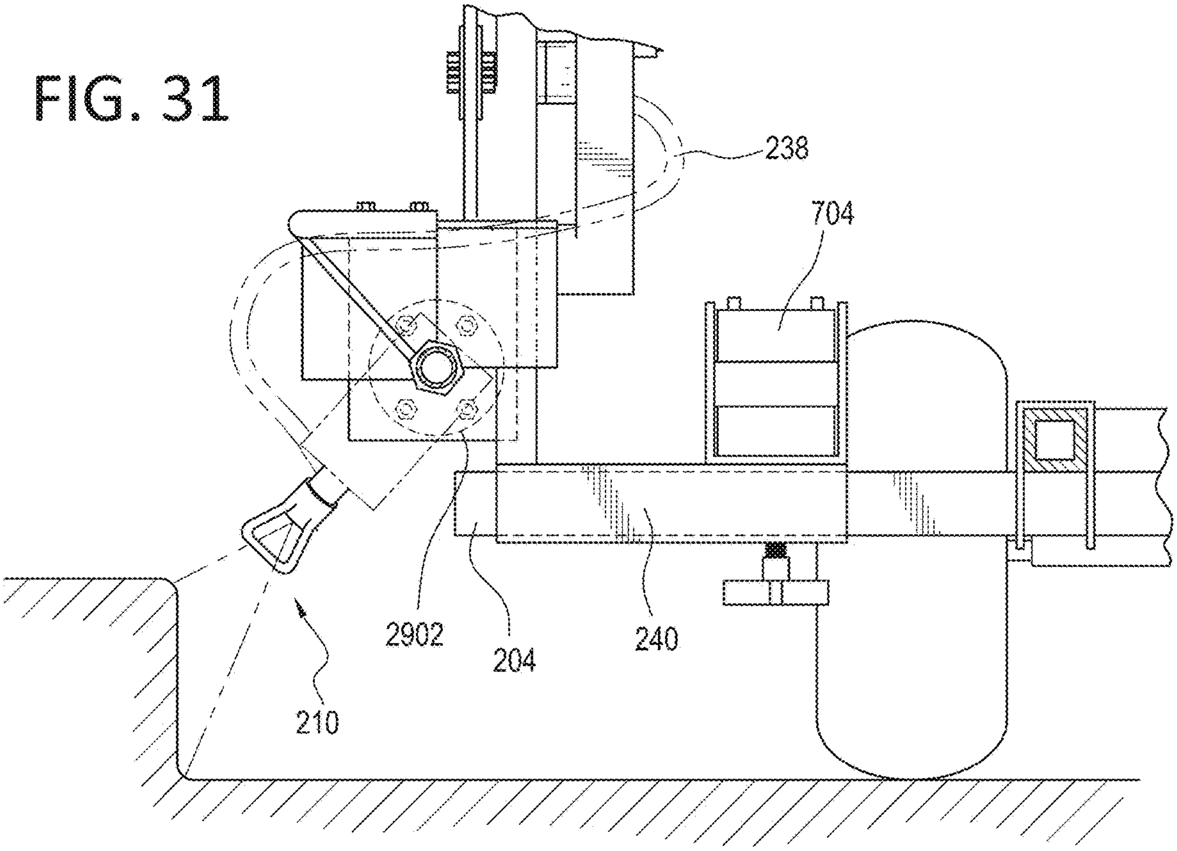
Figure 32:
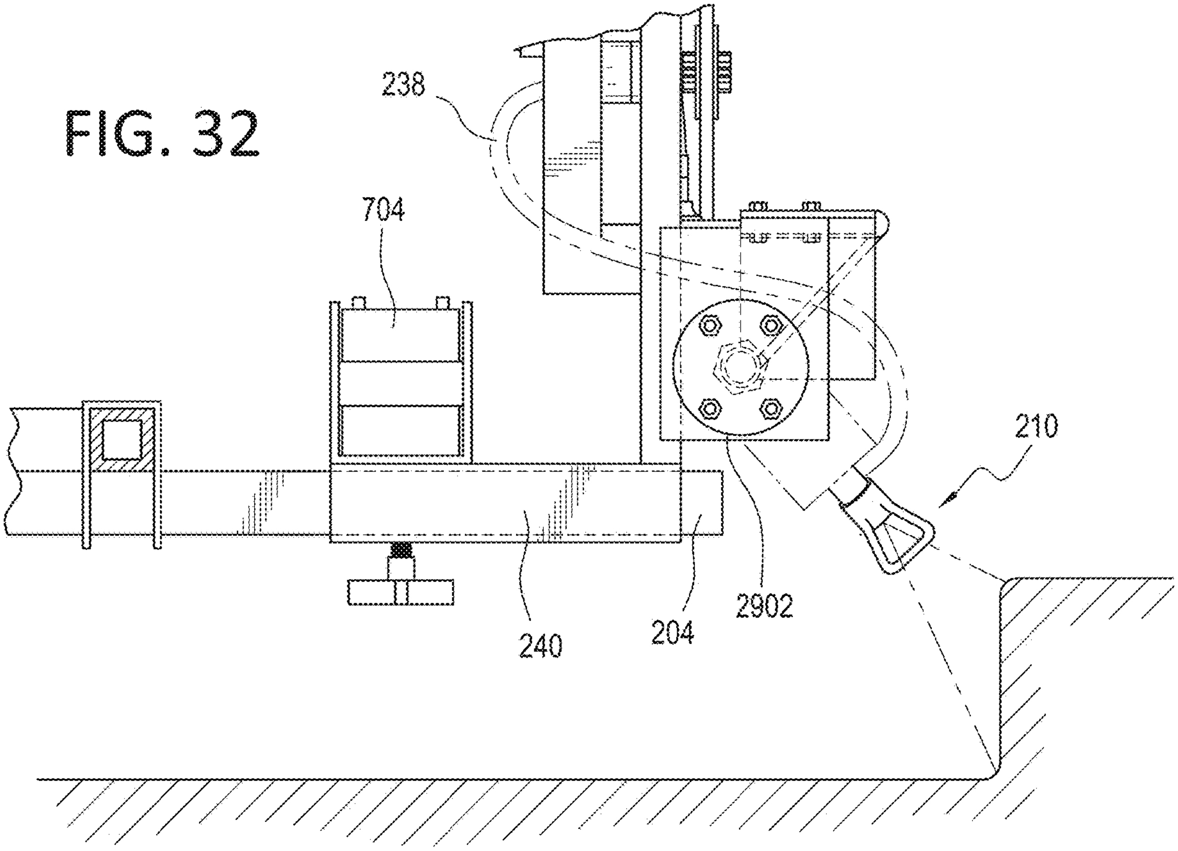

FIG. 29 depicts another example that is similar to FIGS. 2-3 and 21-28, except in lieu of the rotational mechanism provided in FIGS. 2-3 and 21-28, a motor 2902 mounted towards the rear of the spray gun mount bar 208 is used to effect clockwise or counter-clockwise rotation of the spray gun mount bar 208, which in effect results in the clockwise or counter-clockwise rotation of the spray head 210. In FIG. 29, the rotation of the motor is translated to the rotation of the spray gun mount bar 208 and, by extension, the spray head 210. FIG. 30 illustrates a front view of the device depicted in FIG. 29. FIG. 31 depicts another front view of the device in FIG. 29, where the motor 2902 has rotated the spray gun mount bar 208 to position the spray head 210 as shown. FIG. 32 depicts a rear view of the device when the spray gun mount bar 208 and spray head 210 are in a rotated state as shown in FIG. 31.

It should be noted that while the described spray gun mount bar is what is being raised or lowered, it is envisioned where the spray gun itself may be raised or lowered using the mechanisms described herein. Also, while the described spray gun mount bar is what is being rotated, it is envisioned where the spray gun itself may be rotated using the mechanisms described herein.

It should be noted that while a walk-behind line striper is shown in the accompanying figures, other transportation units may be used in conjunction with the present invention.

While a single spray gun is depicted for painting one line, the teaching of this specification may be similarly implemented for a system with two or more spray guns. The use of more than one spray gun is covered within the scope of this invention.

Figure 36A:
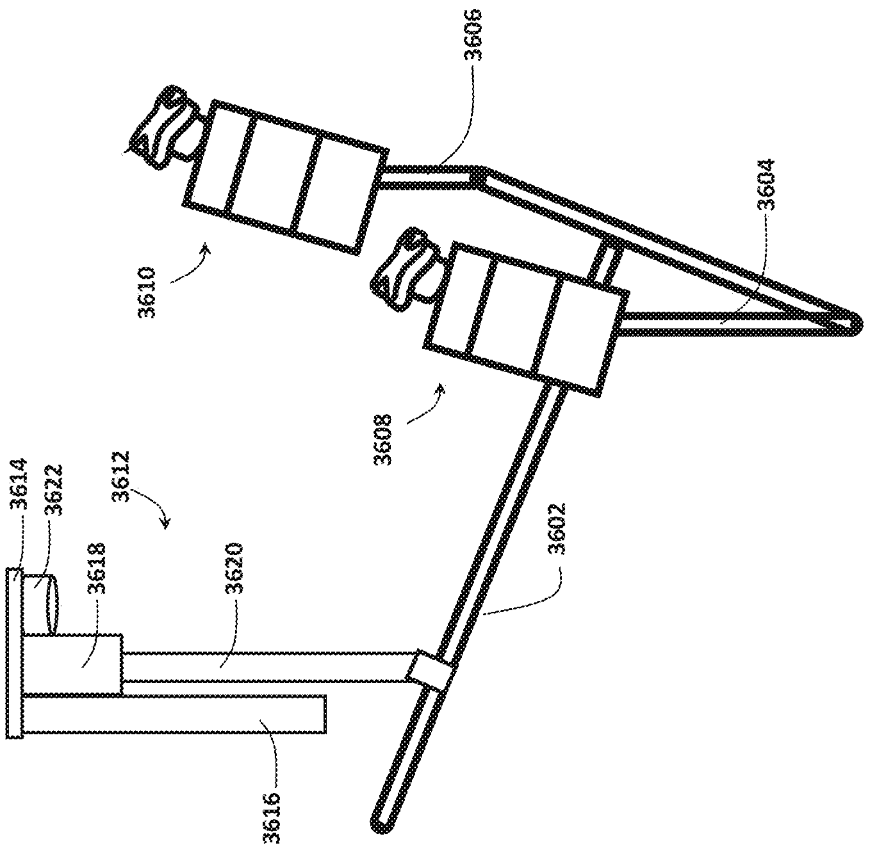
FIGS. 36(A)-(B), 37 and 38 depict various examples where a plurality of spray heads are used.
Figure 36B:
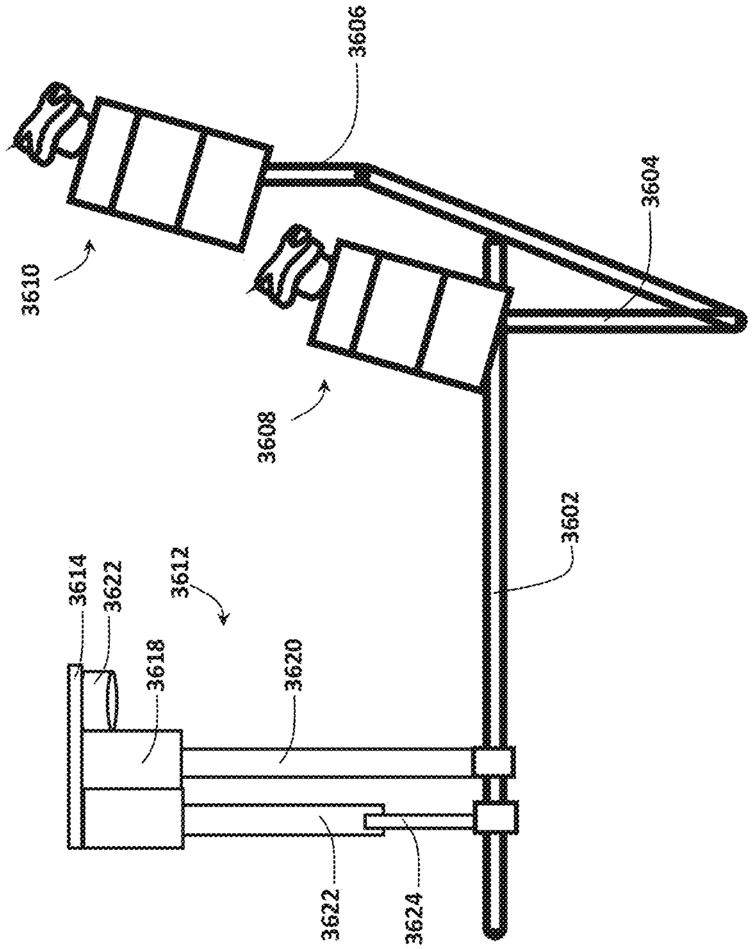

For example, FIG. 36(A) depicts an example where a spray gun height adjustment system for use in a line striper comprising: a control device (as described previously), a modified spray gun mount bar as shown which has a T-shaped horizontal element 3602 having two vertical elements 3604 and 3606 where the vertical element 3604 has a first gun holder assembly 3608 and the second vertical element 3606 holds the second gun holder assembly 3610. A height adjustment mechanism 3612 coupled to the spray gun mount bar (for example, similar to what was described in FIGS. 5(A)-(B)) is used to raise or lower the assembly based on signals transmitted by the control device. Platform 3614 or support 3616 may be used to couple the height adjustment mechanism to the line striper. The generally horizontal platform 3614 supports a generally vertical housing 3618 which has within a rod 3620 which variably (i.e., variable in the length that protrudes out of the housing 3618) extends in and out of the housing 3618 based on the operation of a motor 3622 (e.g., a brushed D.C. motor) which is controlled by the previously described control device. FIG. 36(B) depicts another example for both height and angular rotation, where rod 3622 is connected to another rod 3624 to provide for rotational adjustment of the unit (similar to what was shown in FIG. 6(A)-(B)).

Figure 37:
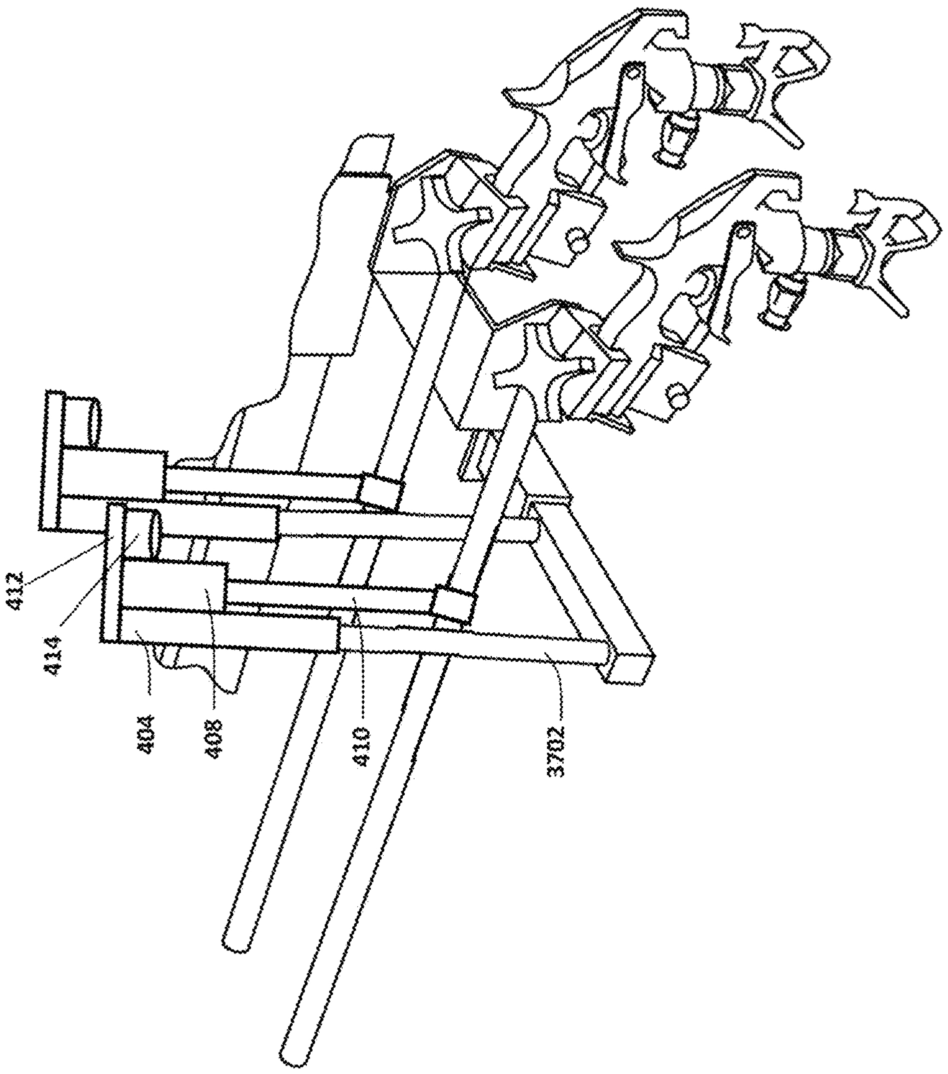

FIG. 37 illustrates another example involving two spray guns, where the height of each of the spray guns are individually controllable via a control device. In a non-limiting example, the height adjustment mechanism shown in FIG. 37 is similar to the one shown in FIGS. 4 and 5(A)-(B), with the vertical element 404 now attached to the vertical element 3702 for support.

Figure 38:
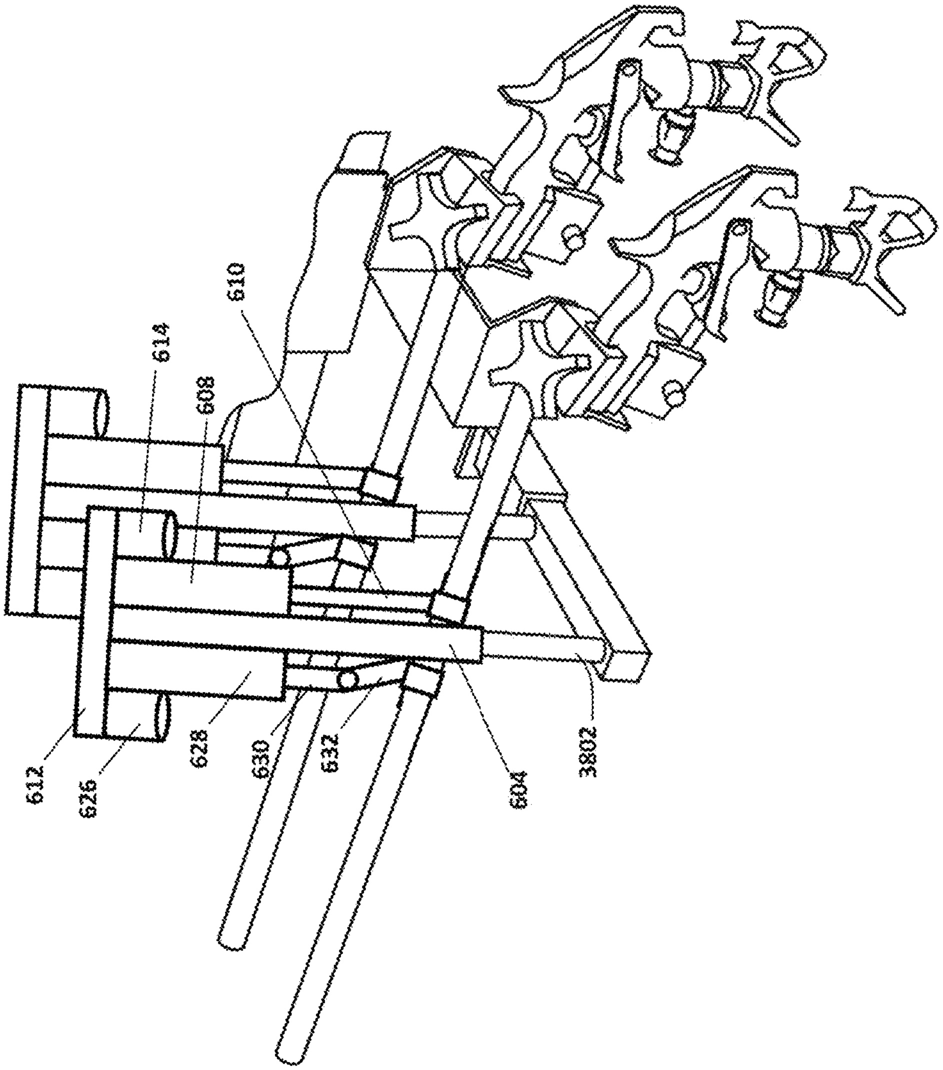

FIG. 38 illustrates another example involving two spray guns, where the height and rotation of each of the spray guns are individually controllable via a control device. In a non-limiting example, the height/rotational adjustment mechanism shown in FIG. 38 is similar to the one shown in FIGS. 6(A)-(B), with the vertical element 604 now attached to the vertical element 3802 for support.

For example, a gas- or battery-operated vehicle may have the disclosed height adjustment mechanisms, spray guns, etc. mounted within structures in such vehicles (via, for example, a mount tube that is part of the vehicle). As another example, a gas- or battery operated vehicle may have the disclosed height adjustment mechanisms, spray guns, etc., mounted on structures external to such vehicles (via, for example, a mount tube mounted on an off-the-shelf, manually, operated line striper), where the vehicle propels such an external structure. As yet another example, a gas- or battery-operated unmanned vehicle may have the disclosed height adjustment mechanisms, spray guns, etc., mounted on structures external to such vehicles (via, for example, a mount tube mounted on an off-the-shelf, manually, operated line striper), where the unmanned vehicle may, either by itself or via remote control, propel such an external structure.

Such transportation units are merely provided as non-limiting examples, as other transportation units that are not described within this disclosure may be used and are within the scope of the present invention.

It is contemplated that various changes and modifications may be made to the spray gun mount without departing from the spirit and scope of the invention as defined by the following claims.

CONCLUSION

The above embodiments show an effective implementation of a height and rotational adjustment system for one or more spray guns used in a line striper. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, specific manufacturing techniques, the type of height adjustment mechanism used, or the type of control device used to control the height adjustment mechanism.

The invention claimed is:

1. A method for adjusting a height and rotation of a spray gun used in a line striper via a graphical user interface (GUI) in a control device, the method comprising:

(a) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar;

(b) raising or lowering the spray gun mount bar based on the first user selection received in (a);

(c) receiving, via the GUI, a second user selection to rotate, either clockwise or counter-clockwise, an angular adjustment mechanism coupled to the spray gun mount bar; and (d) rotating clockwise or counter-clockwise the spray gun mount bar based on the second user selection received in (c).

2. The method of claim 1, wherein the spray gun mount bar is substantially horizontal, and the height adjustment mechanism is substantially vertical.

3. The method of claim 1, wherein the control device is any of the following: a device having one or more of the following: buttons, keys, scroll wheels, or sliders, a device having a joystick, a device having a keypad, a touchscreen device, a smartphone, a tablet, or a PDA.

4. The method of claim 1, wherein the height adjustment mechanism is a rack-and-pinion based system.

5. The method of claim 1, wherein the height adjustment mechanism is a linear actuator.

6. The method of claim 1, wherein the height adjustment mechanism is a micro linear actuator.

7. The method of claim 1, wherein the height adjustment mechanism is any of the following: a mechanical linear actuator, an electro-mechanical actuator, a hydraulic actuator, a pneumatic actuator, a piezoelectric actuator, a twisted and coiled polymer (TCP) actuator, a supercoiled polymer (SCP) actuator, a linear motor, or a telescoping linear actuator.

8. The method of claim 1, wherein the angular adjustment mechanism comprises a linear actuator, where a linear motion of the linear actuator is converted into a rotational motion.

9. The method of claim 1, wherein the angular adjustment mechanism comprises a motor.

10. The method of claim 1, wherein the control device wirelessly transmits signals to the height adjustment mechanism to raise or lower the spray gun mount bar and to the angular adjustment mechanism to rotate, in a clockwise or counter-clockwise manner, the spray gun mount bar.

11. The method of claim 10, wherein wireless data transmission between the control device and the height adjustment mechanism and the wireless data transmission between the control device and the angular adjustment mechanism is over any of the following: a wireless personal area network (WPAN), a Wireless ad hoc network (WANET), wireless data transmission based on Ultra-Wideband (UWB), wireless data transmission based on magnetic induction, wireless data transmission based on infrared wireless (IR), wireless data transmission based on Wireless USB, wireless data transmission based on ZigBee, wireless data transmission based on Z-Wave, wireless data transmission based on wireless millimeter-wave (MMW or mmW), wireless data transmission based on peer-to-peer or ad hoc wireless LAN, wireless data transmission based on Wi-Fi, wireless data transmission based on Ad-Hoc Wi-Fi, wireless data transmission based on Wi-Fi Direct, or wireless data transmission based on peer-to-peer (P2P) Wi-Fi.

12. A method for adjusting a height and rotation of a spray gun used in a line striper via a graphical user interface (GUI) in a control device, the method comprising:

(a) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar;

(b) transmitting a first command to the height adjustment mechanism to raise or lower the spray gun mount bar by a predetermined distance based on the first user selection received in (a);

(c) receiving, via the GUI, a second user selection to rotate, either clockwise or counter-clockwise, an angular adjustment mechanism coupled to the spray gun mount bar; and (d) transmitting a second command to the angular adjustment mechanism to rotate clockwise or counter-clockwise the spray gun mount bar by a predetermined angle based on the second user selection received in (c), the height adjustment mechanism receives the first command and raises or lowers the spray gun mount bar by the predetermined distance based on the first command and the angular adjustment mechanism receives the second command and rotates the spray gun mount bar by the predetermined angle based on the second command.

13. The method of claim 12, wherein the spray gun mount bar is substantially horizontal, and the height adjustment mechanism is substantially vertical.

14. The method of claim 12, wherein the control device is any of the following: a device having one or more of the following: buttons, keys, scroll wheels, or sliders, a device having a joystick, a device having a keypad, a touchscreen device, a smartphone, a tablet, or a PDA.

15. The method of claim 12, wherein the height adjustment mechanism is a rack-and-pinion based system.

16. The method of claim 12, wherein the height adjustment mechanism is a linear actuator.

17. The method of claim 12, wherein the height adjustment mechanism is a micro linear actuator.

18. The method of claim 12, wherein the height adjustment mechanism is any of the following: a mechanical linear actuator, an electro-mechanical actuator, a hydraulic actuator, a pneumatic actuator, a piezoelectric actuator, a twisted and coiled polymer (TCP) actuator, a supercoiled polymer (SCP) actuator, a linear motor, or a telescoping linear actuator.

19. The method of claim 12, wherein the angular adjustment mechanism comprises a linear actuator, where a linear motion of the linear actuator is converted into a rotational motion.

20. The method of claim 12, wherein the angular adjustment mechanism comprises a motor.

21. The method of claim 12, wherein the control device wirelessly transmits signals to the height adjustment mechanism to raise or lower the spray gun mount bar and to the angular adjustment mechanism to rotate, in a clockwise or counter-clockwise manner, the spray gun mount bar.

22. The method of claim 21, wherein wireless data transmission between the control device and the height adjustment mechanism and the wireless data transmission between the control device and the angular adjustment mechanism is over any of the following: a wireless personal area network (WPAN), a Wireless ad hoc network (WANET), wireless data transmission based on Ultra-Wideband (UWB), wireless data transmission based on magnetic induction, wireless data transmission based on infrared wireless (IR), wireless data transmission based on Wireless USB, wireless data transmission based on ZigBee, wireless data transmission based on Z-Wave, wireless data transmission based on wireless millimeter-wave (MMW or mmW), wireless data transmission based on peer-to-peer or ad hoc wireless LAN, wireless data transmission based on Wi-Fi, wireless data transmission based on Ad-Hoc Wi-Fi, wireless data transmission based on Wi-Fi Direct, or wireless data transmission based on peer-to-peer (P2P) Wi-Fi.

23. A method for adjusting a height and rotation of a spray gun used in a line striper via a graphical user interface (GUI) in a control device, the method comprising:

(e) receiving, via the GUI, a first user selection to either raise or lower a spray gun mount bar via a height adjustment mechanism, the spray gun mount bar having a gun holder assembly to retain the spray gun and the height adjustment mechanism coupled to the spray gun mount bar;

(f) wirelessly transmitting a first command to the height adjustment mechanism to raise or lower the spray gun mount bar by a predetermined distance based on the first user selection received in (a);

(g) receiving, via the GUI, a second user selection to rotate, either clockwise or counter-clockwise, an angular adjustment mechanism coupled to the spray gun mount bar; and (h) wirelessly transmitting a second command to the angular adjustment mechanism to rotate clockwise or counter-clockwise the spray gun mount bar by a predetermined angle based on the second user selection received in (c), wherein the height adjustment mechanism wirelessly receives the first command and raises or lowers the spray gun mount bar by the predetermined distance based on the first command and the angular adjustment mechanism wirelessly receives the second command and rotates the spray gun mount bar by the predetermined angle based on the second command.

* * * * *